(12) United States Patent
Ohmori et al.

(10) Patent No.: US 10,061,472 B2
(45) Date of Patent: Aug. 28, 2018

(54) INFORMATION TERMINAL, INFORMATION PRESENTATION METHOD FOR AN INFORMATION TERMINAL, AND INFORMATION PRESENTATION PROGRAM

(75) Inventors: Kenta Ohmori, Tokyo (JP); Takashi Kawakami, Tokyo (JP); Seigo Iwasaki, Tokyo (JP); Hiroyuki Kawakami, Kanagawa (JP); Akitaka Kimura, Tokyo (JP); Xiaoyu Ruan, Tokyo (JP); George Arriola, Atlanta, GA (US); Yoshimitsu Funabashi, Atlanta, GA (US); Kichiro Kurozumi, Lund (SE); Brian Johnson, Atlanta, GA (US); Jorge Furuya, Atlanta, GA (US); Takahiro Kawaguchi, Atlanta, GA (US)

(73) Assignee: Sony Mobile Communications Inc., Tokyo (JP)

( * ) Notice: Subject to any disclaimer, the term of this patent is extended or adjusted under 35 U.S.C. 154(b) by 809 days.

(21) Appl. No.: 13/265,460

(22) PCT Filed: Sep. 30, 2009

(86) PCT No.: PCT/JP2009/005035
§ 371 (c)(1),
(2), (4) Date: Oct. 20, 2011

(87) PCT Pub. No.: WO2010/131304
PCT Pub. Date: Nov. 18, 2010

(65) Prior Publication Data
US 2012/0036443 A1    Feb. 9, 2012

(30) Foreign Application Priority Data
May 11, 2009  (JP) .................................. 2009-114779

(51) Int. Cl.
*G06F 3/0482* (2013.01)
*H04M 1/725* (2006.01)
(Continued)

(52) U.S. Cl.
CPC .......... *G06F 3/0482* (2013.01); *G06F 3/0485* (2013.01); *G06F 3/0486* (2013.01);
(Continued)

(58) Field of Classification Search
CPC ......... H04M 1/72552; H04M 1/72522; H04M 1/72547; H04M 1/72597; H04M 1/72586; H04L 51/36; G06F 3/0482
(Continued)

(56) References Cited

U.S. PATENT DOCUMENTS 5,880,733 A * 3/1999 Horvitz et al. ............... 715/850
6,025,827 A * 2/2000 Bullock et al. ............... 715/201
(Continued)

FOREIGN PATENT DOCUMENTS

CN    1625886 A  *  6/2005
CN    1870661 A  * 11/2006
(Continued)

OTHER PUBLICATIONS

U.S. Appl. No. 13/377,828, filed Dec. 13, 2011, Arriola, et al.
(Continued)

*Primary Examiner* — Nicholas Ulrich
(74) *Attorney, Agent, or Firm* — Xsensus, LLP

(57) ABSTRACT

An information terminal enables a user to simply and easily confirm a plurality of pieces of update information handled by a plurality of various application programs without any troublesome operation. An information storage stores a plurality of different types of information. An update information storage stores a part of information updated in the information storages as update information associated with
(Continued)

the respective types. An update information manager monitors an information update in the information storages and stores, when an information update is made in the information storages, the part of the updated information in the update information storage as update information associated with the respective types. Further, an information selector extracts the update information stored in the update information storage in time series and outputs them to display them on a screen.

12 Claims, 17 Drawing Sheets

(51) Int. Cl.
    *G06F 3/0486*    (2013.01)
    *G06F 3/0488*    (2013.01)
    *H04M 1/2745*    (2006.01)
    *G06F 3/0481*    (2013.01)
    *G06F 3/0485*    (2013.01)

(52) U.S. Cl.
    CPC ........ *G06F 3/0488* (2013.01); *G06F 3/04817* (2013.01); *G06F 3/04883* (2013.01); *H04M 1/274525* (2013.01); *H04M 1/72547* (2013.01); *H04M 1/72586* (2013.01); *H04M 1/72597* (2013.01); *H04M 2250/60* (2013.01)

(58) Field of Classification Search
    USPC ....... 715/736, 766, 810, 835, 836, 848–850, 715/852, 853, 863, 864
    See application file for complete search history.

(56) References Cited

U.S. PATENT DOCUMENTS

| | | | | |
|---|---|---|---|---|
| 6,075,536 | A * | 6/2000 | Kunieda et al. | 715/848 |
| 6,577,330 | B1 * | 6/2003 | Tsuda et al. | 715/782 |
| 6,583,797 | B1 * | 6/2003 | Roth | 715/810 |
| 7,478,326 | B2 * | 1/2009 | Holecek et al. | 715/716 |
| 7,552,397 | B2 * | 6/2009 | Holecek et al. | 715/788 |
| 7,979,879 | B2 * | 7/2011 | Kazama et al. | 725/41 |
| 8,103,974 | B2 * | 1/2012 | Rhee et al. | 715/864 |
| 8,181,124 | B2 * | 5/2012 | Ebert et al. | 715/864 |
| 8,341,541 | B2 * | 12/2012 | Holecek et al. | 715/782 |
| 8,564,543 | B2 * | 10/2013 | Chaudhri | 345/173 |
| 8,564,544 | B2 * | 10/2013 | Jobs et al. | 345/173 |
| 8,565,728 | B2 * | 10/2013 | Okagaki | 455/412.1 |
| 8,640,040 | B2 * | 1/2014 | Lundy | G06F 3/0237 |
| | | | | 715/772 |
| 2004/0075687 | A1 * | 4/2004 | Oshiro | H04M 1/72547 |
| | | | | 715/752 |
| 2004/0193625 | A1 * | 9/2004 | Sutoh | G06F 11/1471 |
| 2005/0020316 | A1 * | 1/2005 | Mahini | G06F 3/0482 |
| | | | | 455/566 |
| 2005/0091596 | A1 * | 4/2005 | Anthony et al. | 715/712 |
| 2005/0132053 | A1 * | 6/2005 | Roth et al. | 709/227 |
| 2006/0031776 | A1 * | 2/2006 | Glein et al. | 715/779 |
| 2006/0174201 | A1 * | 8/2006 | Zaner-Godsey | H04L 67/24 |
| | | | | 715/736 |
| 2006/0187204 | A1 * | 8/2006 | Yi et al. | 345/158 |
| 2007/0070066 | A1 * | 3/2007 | Bakhash | 345/419 |
| 2007/0211871 | A1 | 9/2007 | Sjolander et al. | |
| 2007/0237032 | A1 * | 10/2007 | Rhee et al. | 368/10 |
| 2008/0009311 | A1 | 1/2008 | Nam et al. | |
| 2008/0028324 | A1 * | 1/2008 | Coutts | G06F 3/0481 |
| | | | | 715/752 |
| 2008/0034307 | A1 * | 2/2008 | Cisler et al. | 715/764 |
| 2008/0034327 | A1 * | 2/2008 | Cisler et al. | 715/854 |
| 2008/0055269 | A1 * | 3/2008 | Lemay et al. | 345/173 |
| 2008/0059958 | A1 * | 3/2008 | Bolanowski | 717/168 |
| 2008/0066016 | A1 * | 3/2008 | Dowdy et al. | 715/854 |
| 2008/0307345 | A1 * | 12/2008 | Hart et al. | 715/769 |
| 2009/0002335 | A1 * | 1/2009 | Chaudhri | 345/173 |
| 2009/0047983 | A1 * | 2/2009 | Klassen et al. | 455/466 |
| 2009/0138828 | A1 * | 5/2009 | Schultz et al. | 715/853 |
| 2009/0249247 | A1 * | 10/2009 | Tseng | H04M 1/72552 |
| | | | | 715/808 |
| 2009/0327921 | A1 * | 12/2009 | Holm-Peterson et al. | 715/753 |
| 2010/0146384 | A1 * | 6/2010 | Peev | H04M 1/673 |
| | | | | 715/255 |
| 2010/0159995 | A1 * | 6/2010 | Stallings | G06F 3/0488 |
| | | | | 455/566 |
| 2010/0281409 | A1 * | 11/2010 | Rainisto | G06F 9/4443 |
| | | | | 715/767 |
| 2012/0083260 | A1 * | 4/2012 | Arriola et al. | 455/418 |

FOREIGN PATENT DOCUMENTS

| | | | |
|---|---|---|---|
| CN | 101115089 A | * | 1/2008 |
| JP | 2007-82190 | | 3/2007 |
| WO | 2007 102048 | | 9/2007 |

OTHER PUBLICATIONS

International Search Report dated Apr. 8, 2010 in PCT/JP09/005035 filed Sep. 30, 2009.
Combined Office Action and Search Report dated Jan. 13, 2014 in Chinese Patent Application No. 200980159109.7 with English language translation.
Combined Chinese Office Action and Search Report dated Jul. 4, 2013, in Chinese Patent Application No. 200980159109.7 with English translation.

* cited by examiner

[Fig. 1]
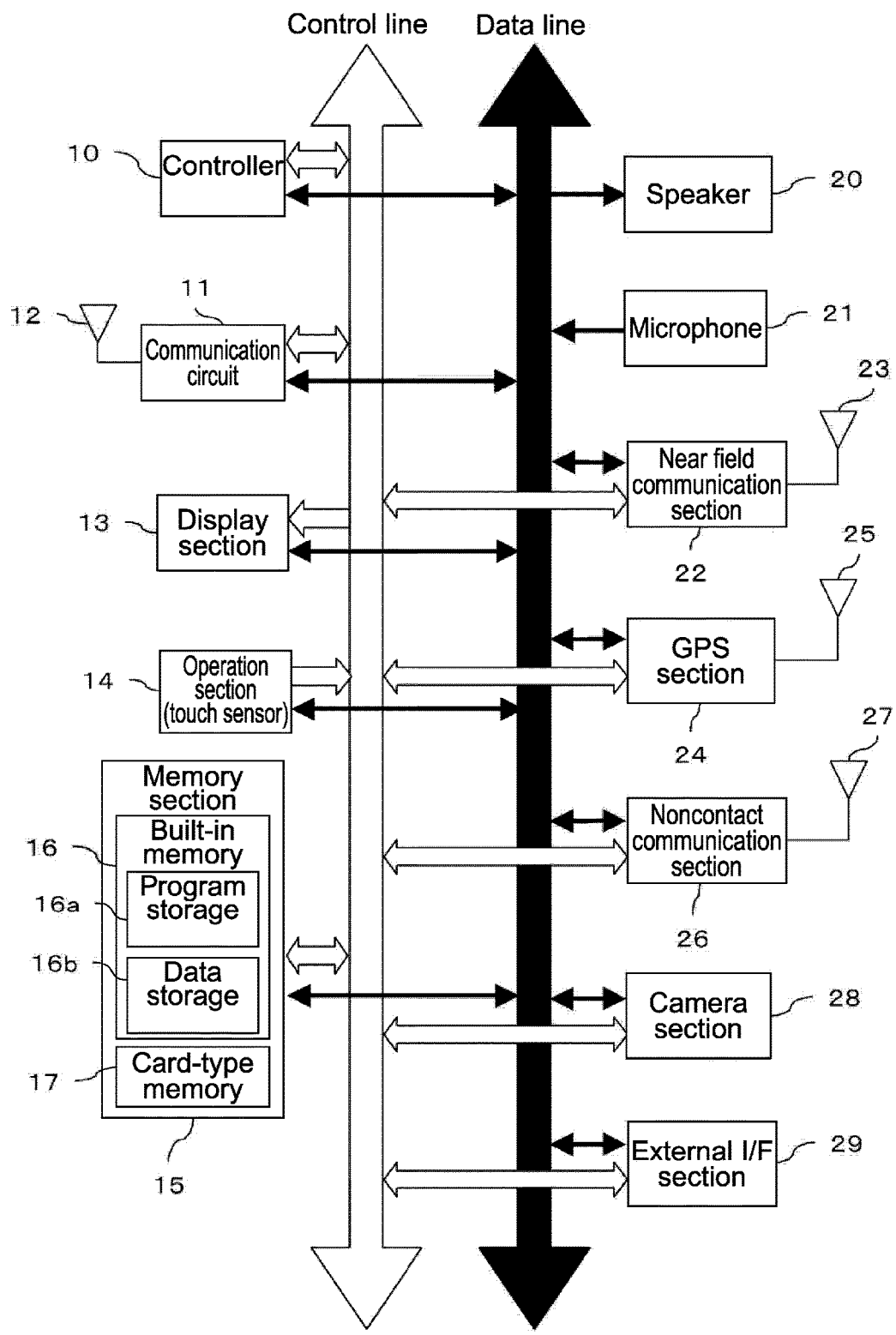

[Fig. 2]
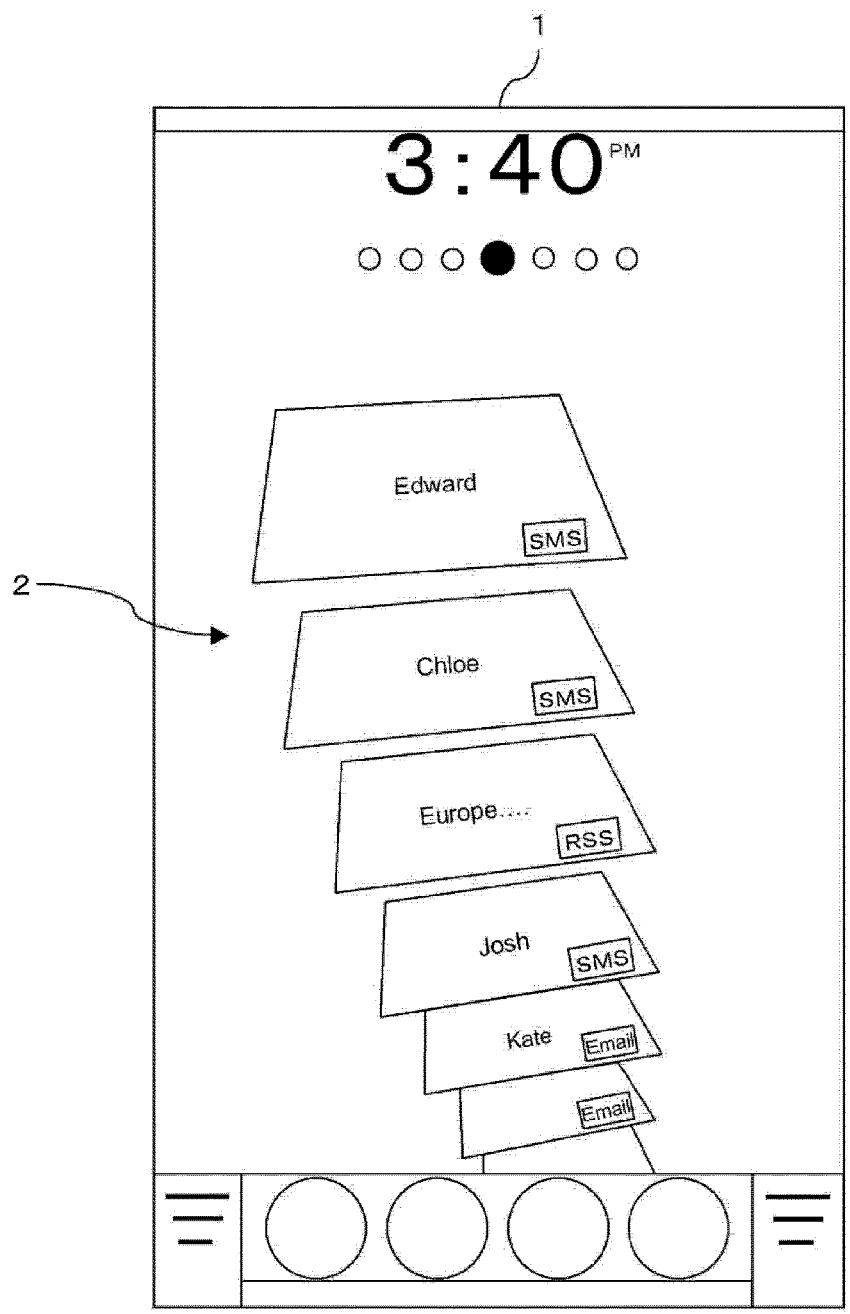

[Fig. 3]
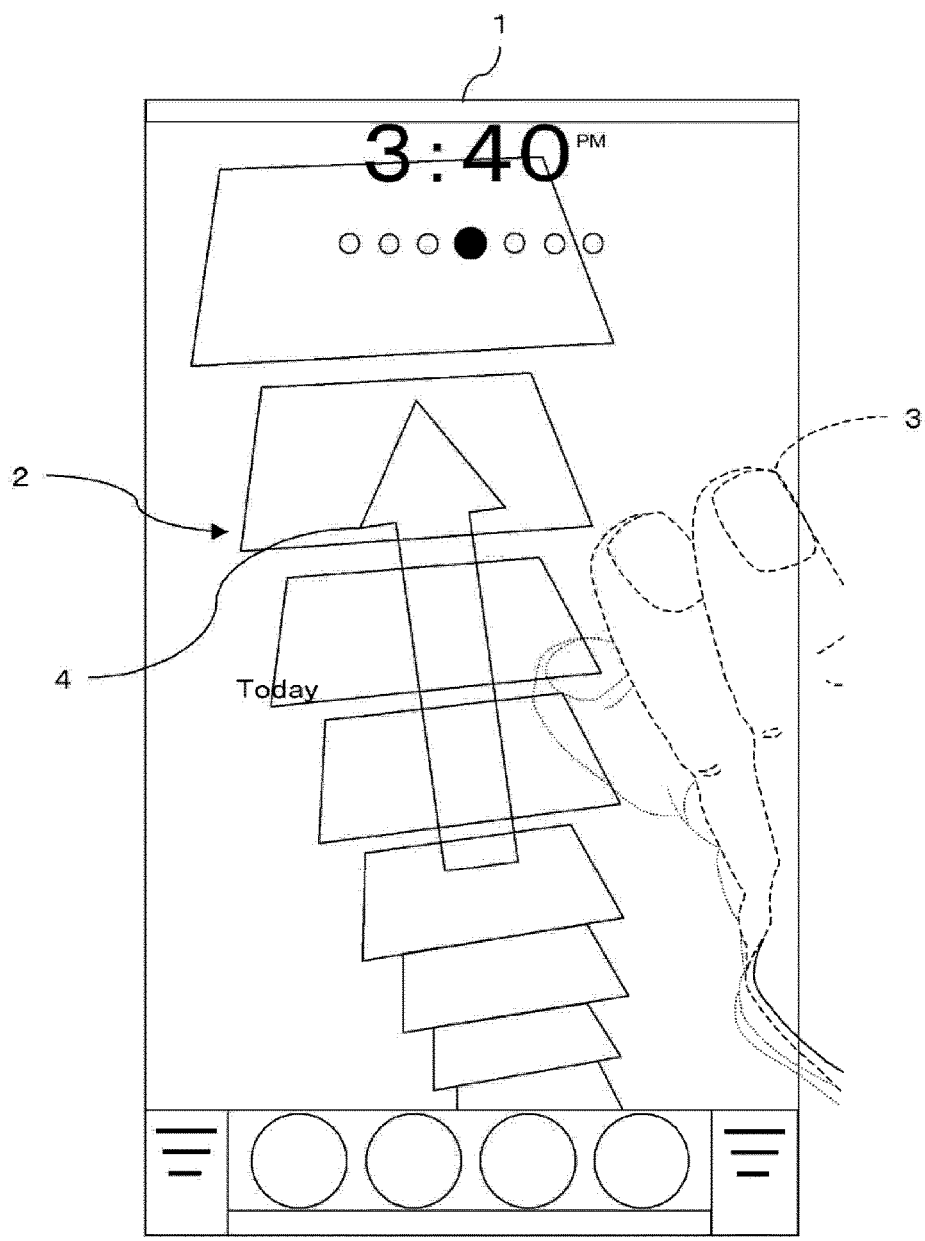

[Fig. 4]
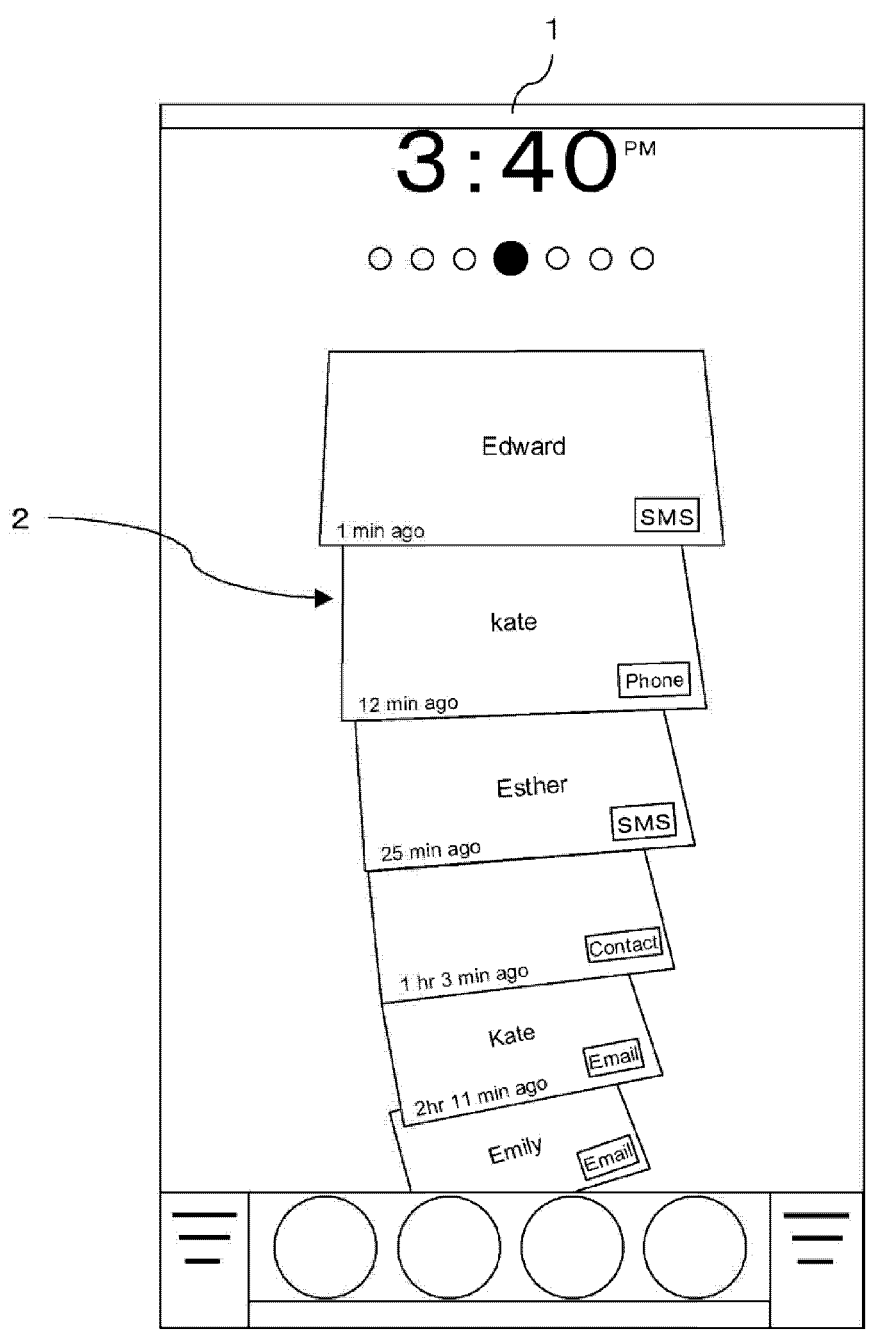

[Fig. 5]
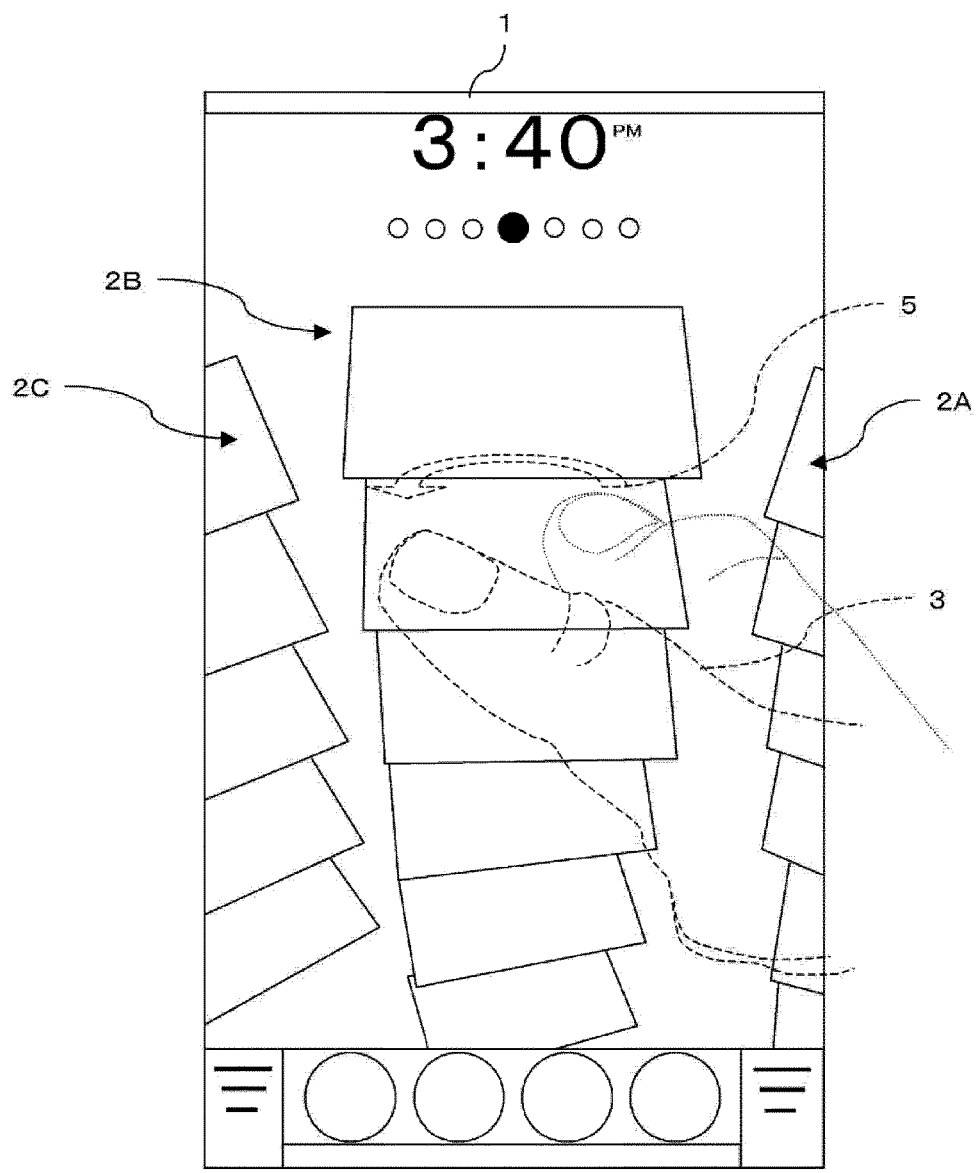

[Fig. 6]
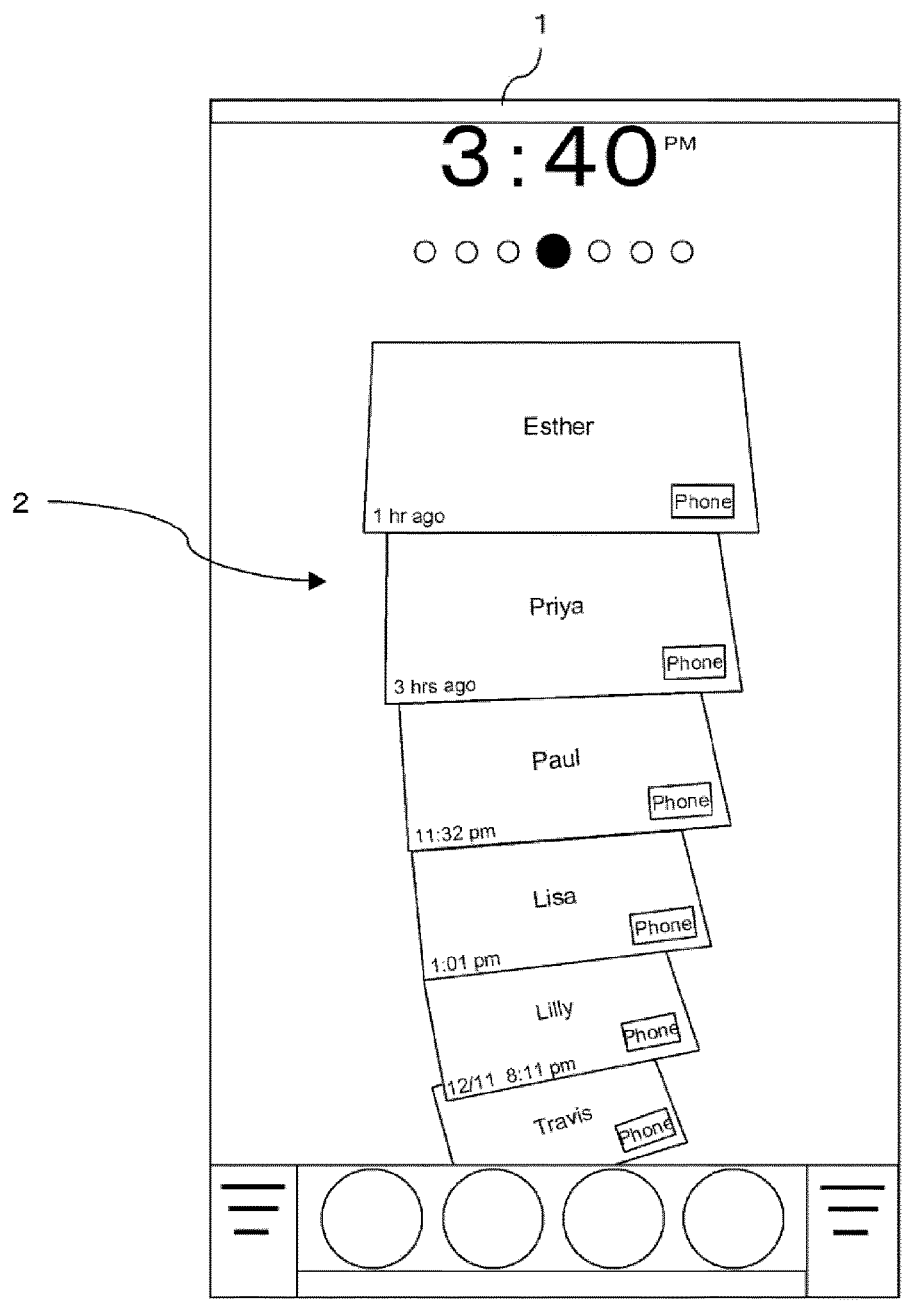

[Fig. 7]
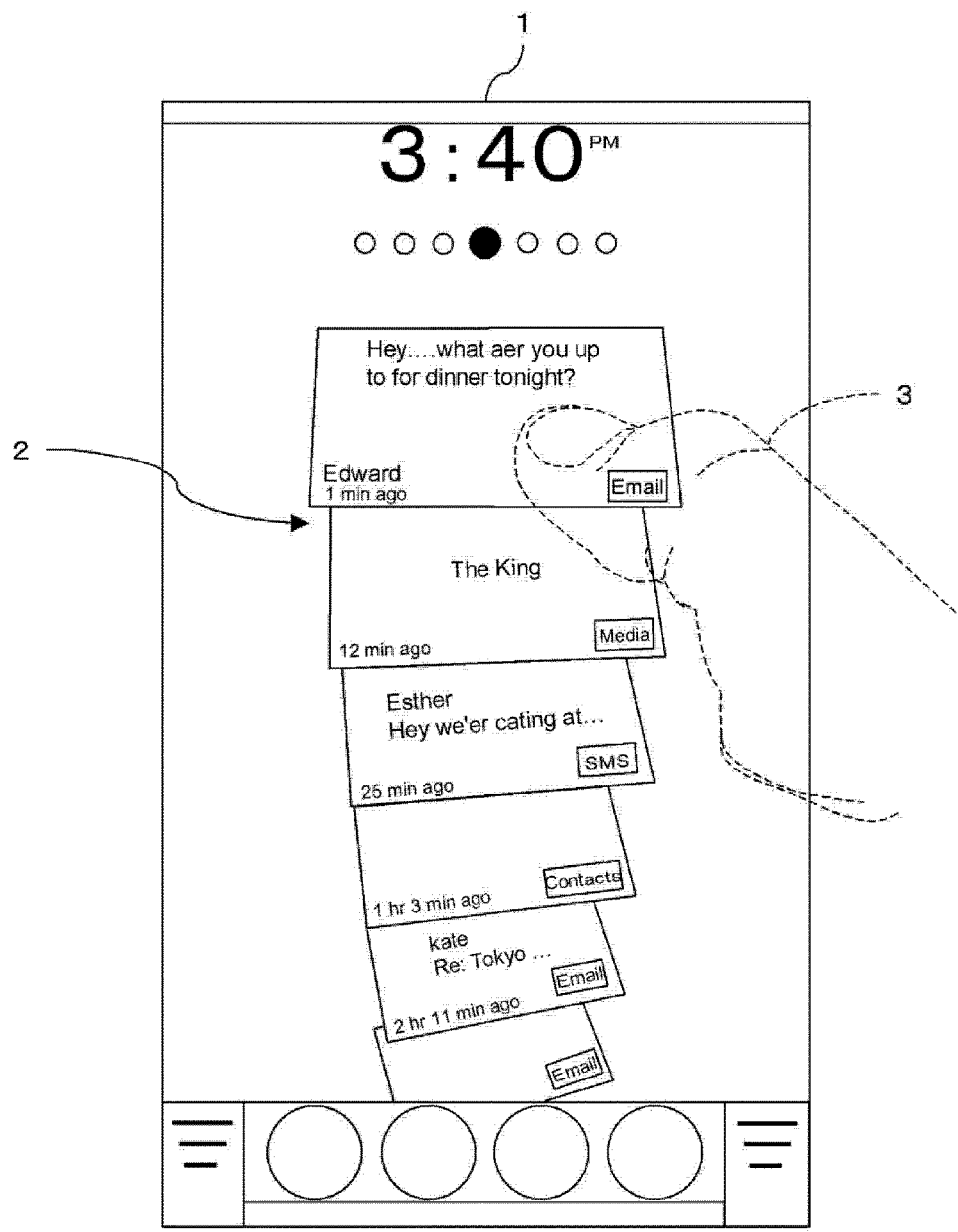

[Fig. 8]
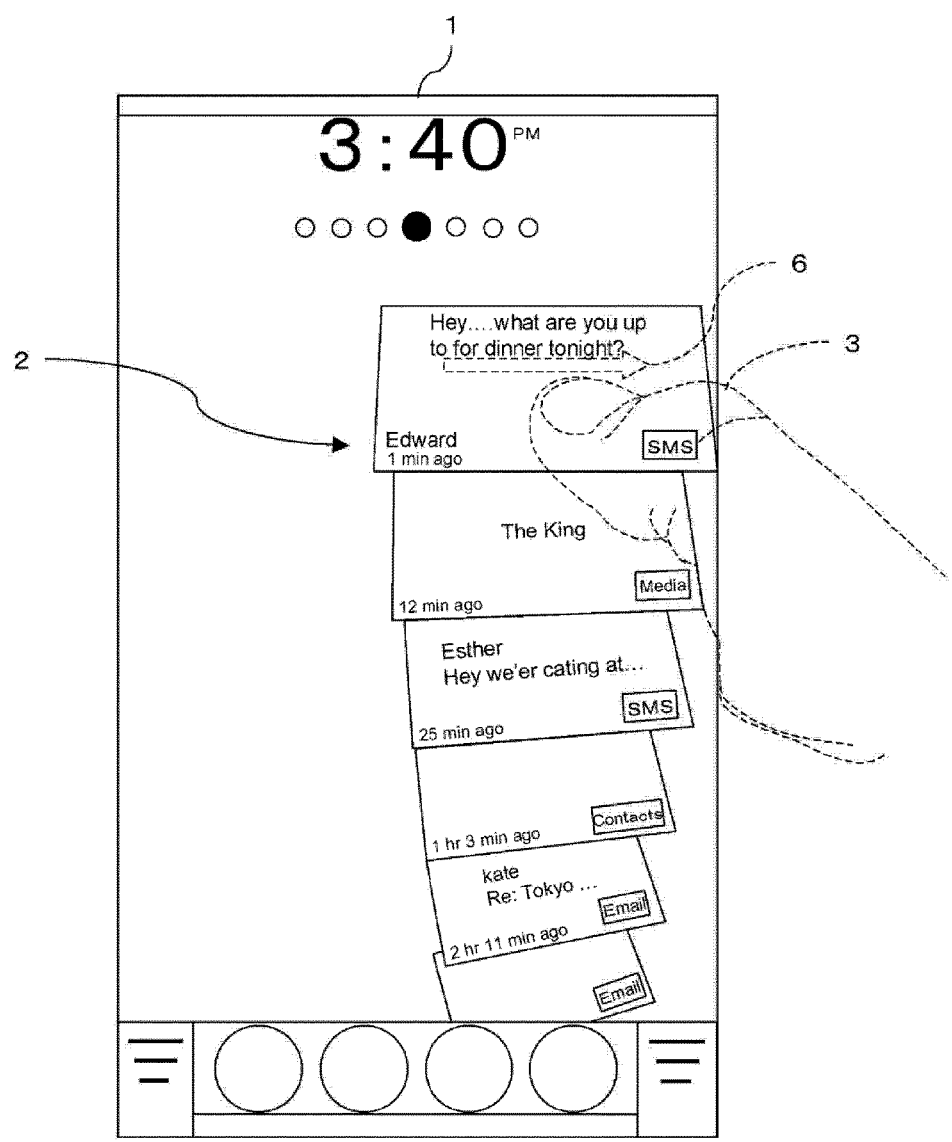

[Fig. 9]
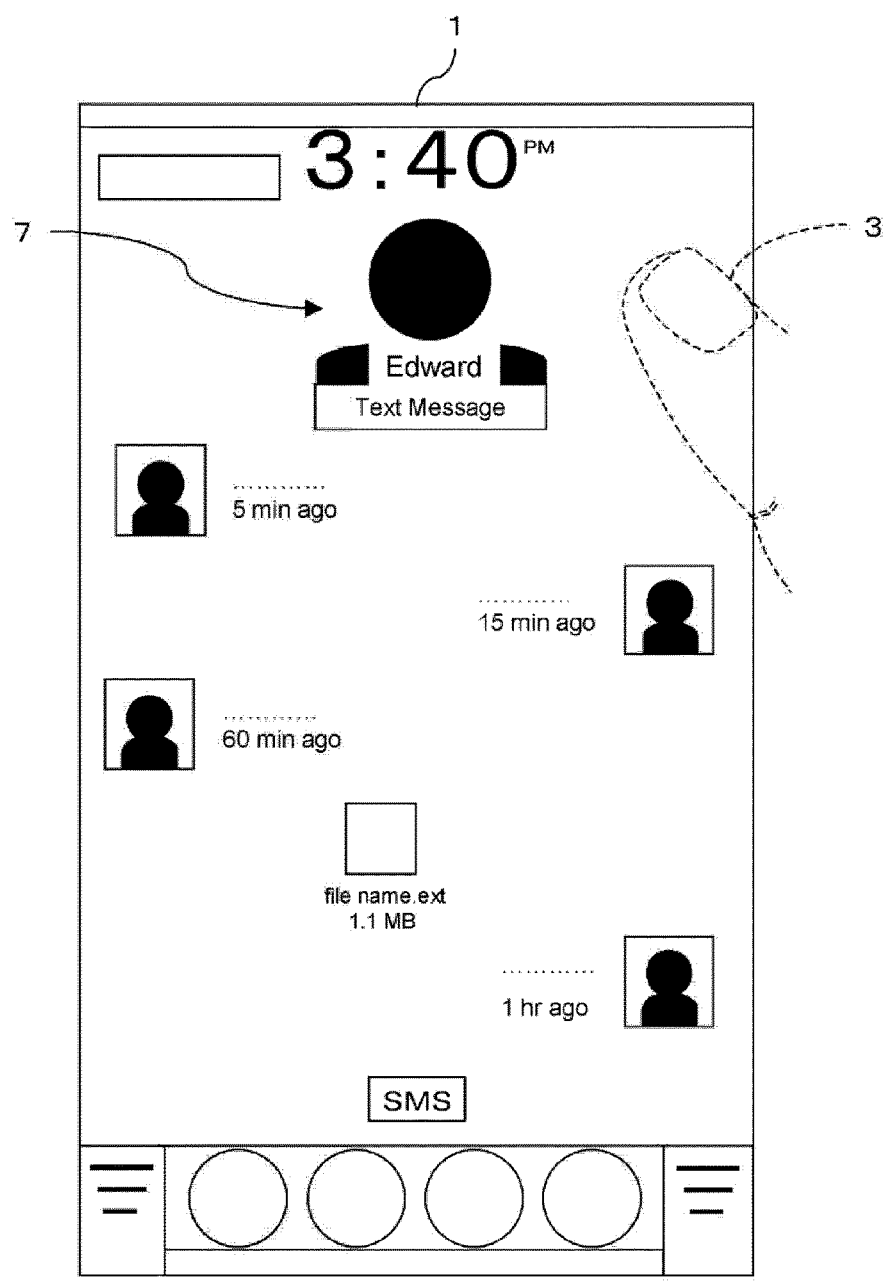

[Fig. 10]
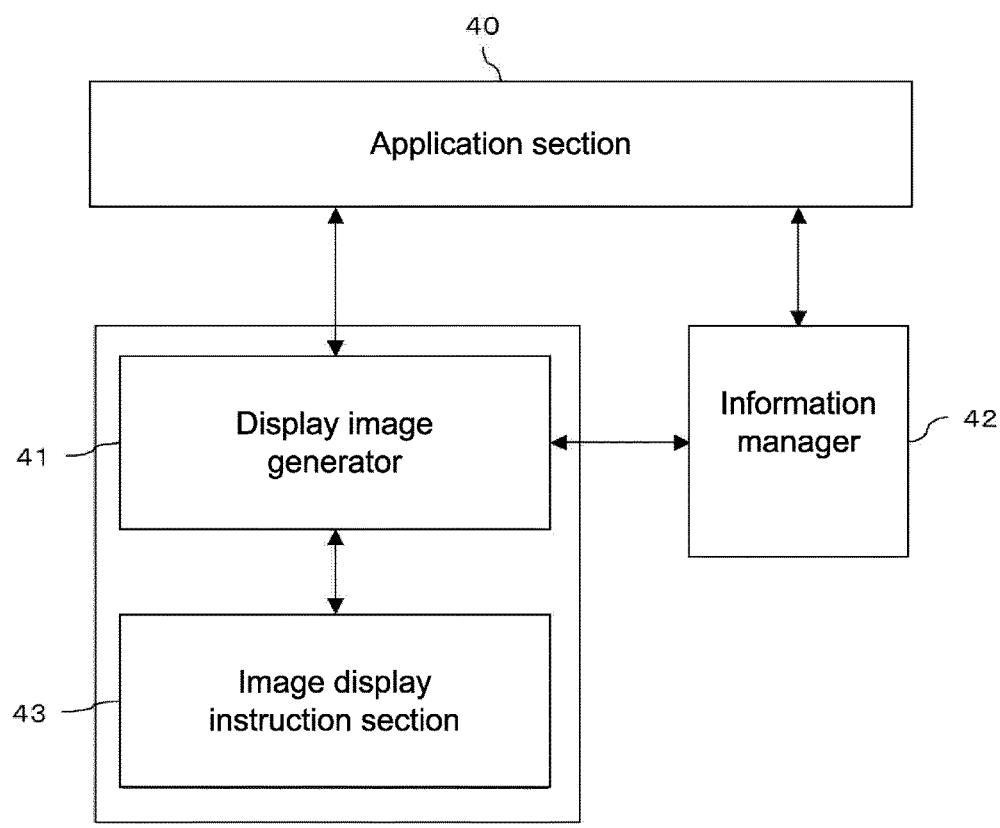

[Fig. 11]
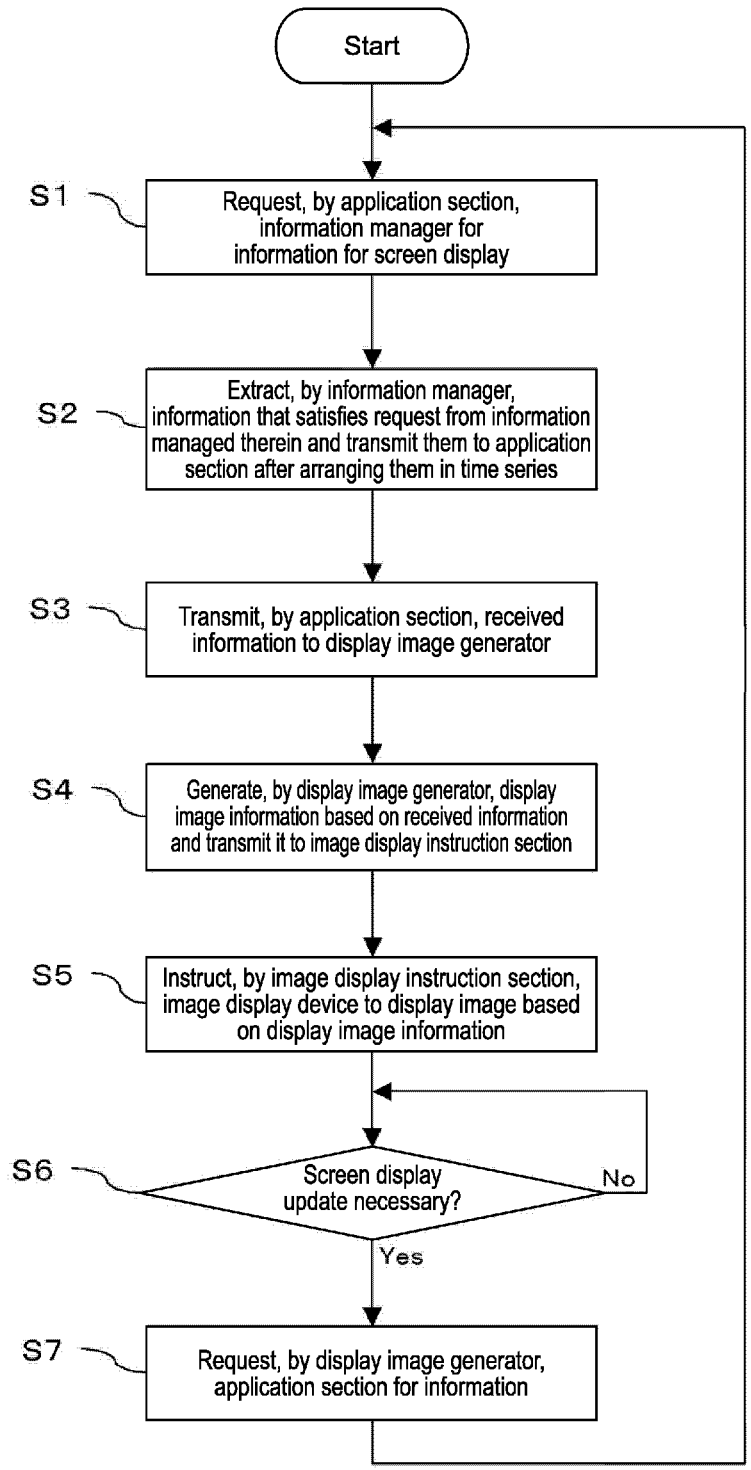

[Fig. 12]
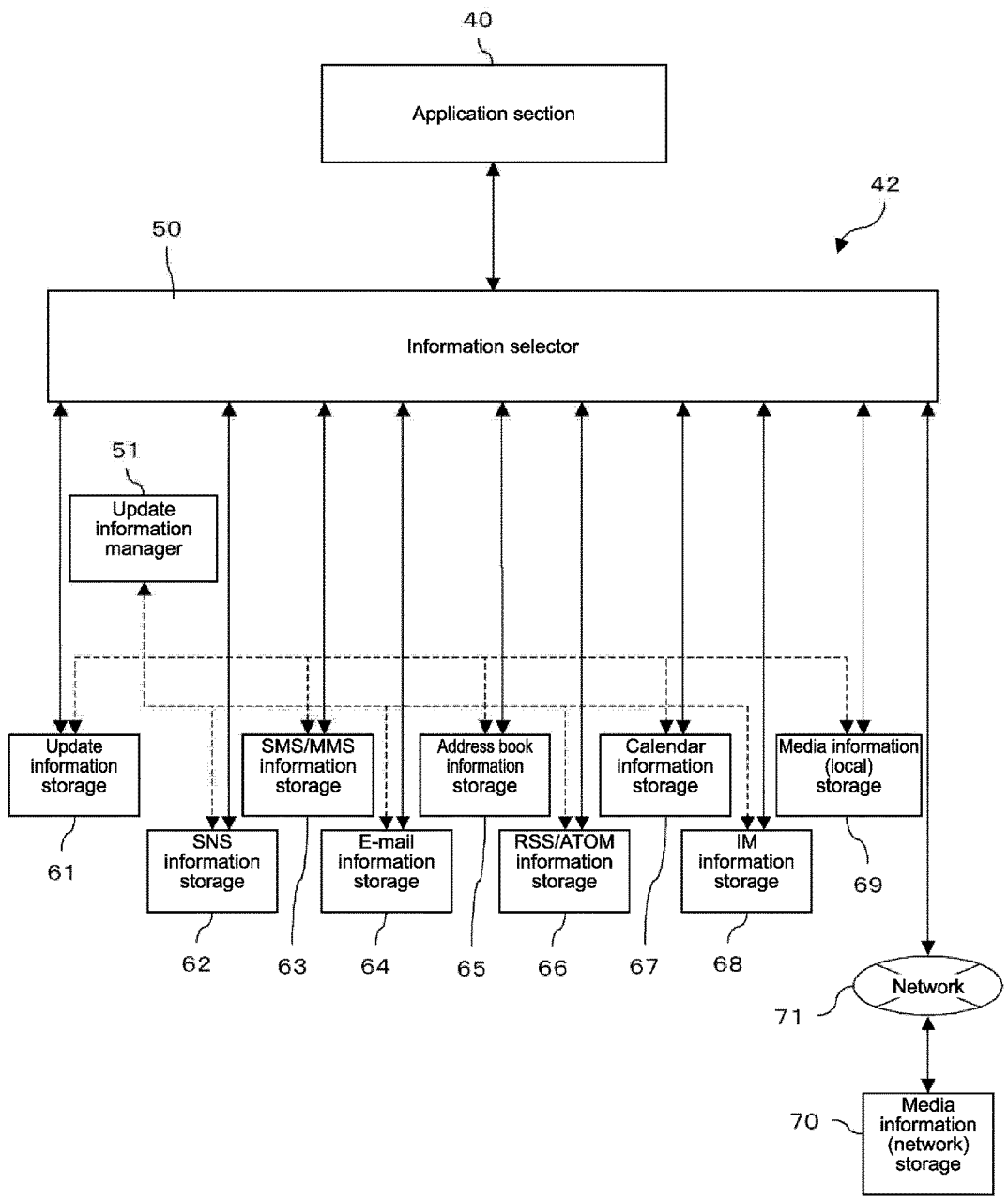

[Fig. 13]
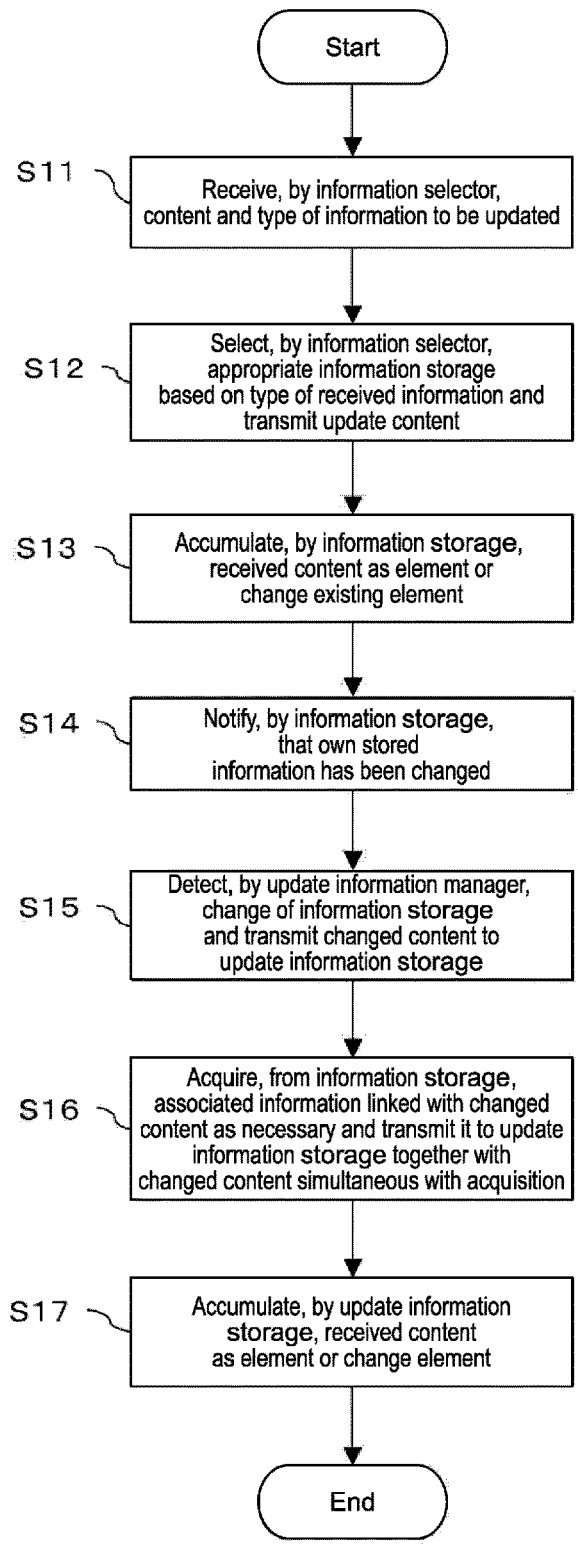

[Fig. 14]
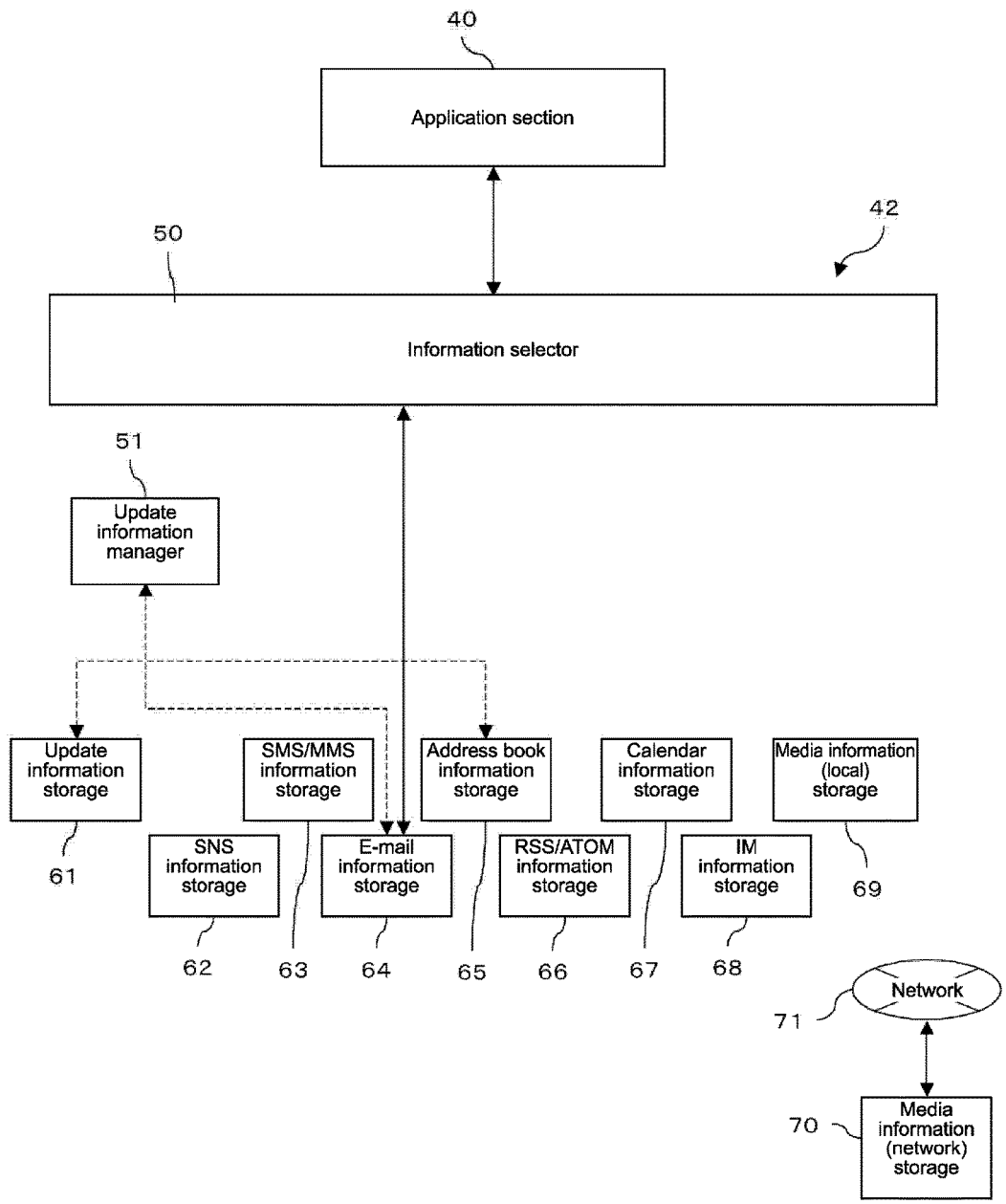

[Fig. 15]

| Content type | Content type specifics | Category | Subcategory | Source ID | Image | Text | Timestamp | Display time | Preview text |
|---|---|---|---|---|---|---|---|---|---|
| Media | Latest downloaded song | Media | Music | Media ID | Album reference destination | Artist name | Stored date and time | | Song title |
| | Latest downloaded moving image | Media | Moving image | Media ID | Thumbnail moving image reference destination | Moving image title | Stored date and time | | |
| | Latest captured moving image | Media | Moving image | Media ID | Thumbnail moving image reference destination | Moving image title | Stored date and time | Captured date and time | |
| | Latest captured photograph | Media | Photograph | Media ID | Thumbnail photograph reference destination | | Stored date and time | Captured date and time | |
| Call | Missed call (registered) | Call | Missed call | Call log ID | Caller photograph reference destination | Caller | Stored date and time | Called date and time | Phone number |
| | Missed call (unregistered) | Call | Missed call | Call log ID | | Phone number | Stored date and time | Called date and time | |
| | Received SMS/MMS (registered) | | Received SMS/MMS | Message ID | Sender photograph reference destination | Sender | Stored date and time | Received date and time | Message (within limited number of letters) |
| | Received SMS/MMS (unregistered) | | Received SMS/MMS | Message ID | | Phone number | Stored date and time | Received date and time | Message (within limited number of letters) |
| E-mail | Received e-mail (registered) | E-mail | Received e-mail | E-mail ID | | Sender | Stored date and time | Received date and time | Message (within limited number of letters) |
| | Received e-mail (unregistered) | E-mail | Received e-mail | E-mail ID | | E-mail address | Stored date and time | Received date and time | Message (within limited number of letters) |
| | (Registered) | | SNS service provider | SNS update message ID | Contactor photograph reference destination | Name of contactor | Stored date and time | | Update text preview |
| | (Unregistered) | | SNS service provider | SNS update message ID | SNS service photograph reference destination | SNS service name | Stored date and time | | Update text preview |

[Fig. 16]
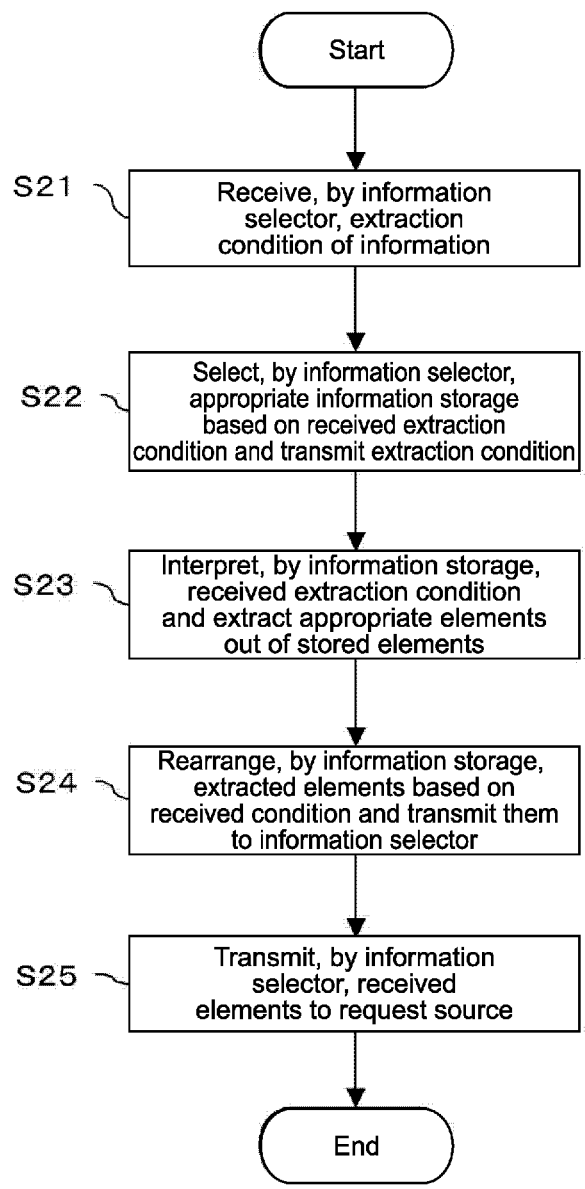

[Fig. 17]
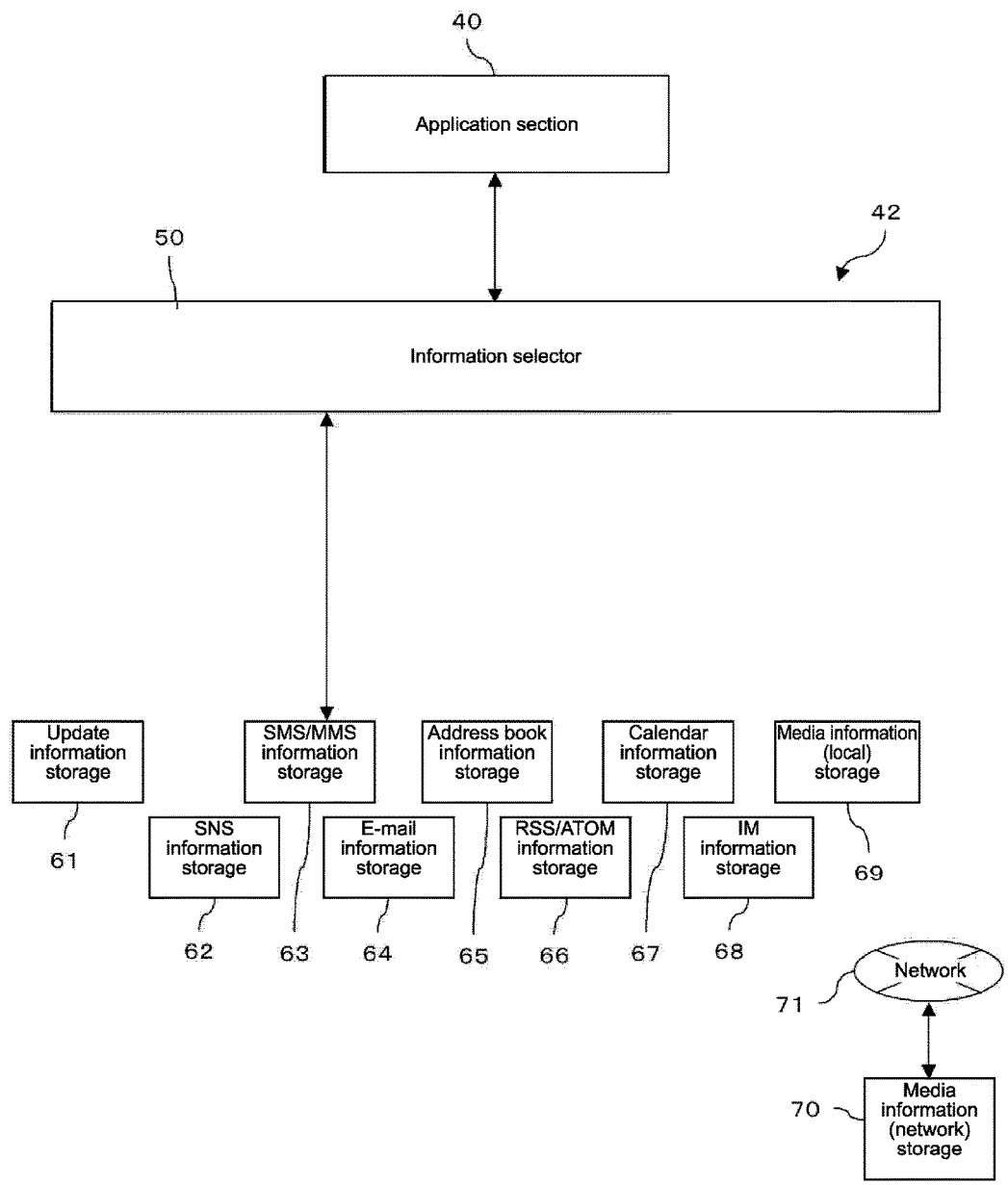

INFORMATION TERMINAL, INFORMATION PRESENTATION METHOD FOR AN INFORMATION TERMINAL, AND INFORMATION PRESENTATION PROGRAM

TECHNICAL FIELD

The present invention relates to an information terminal such as a cellular phone, and an information presentation method and information presentation program for presenting various types of information handled in the information terminal to a user.

BACKGROUND ART

Conventionally, a cellular phone terminal as a typical example of a mobile information terminal has a function of displaying a list of incoming/outgoing call histories of calls, transmission/reception histories of e-mails, reception histories of other messages, and the like.

For example, Japanese Patent Application Laid-open No. 2001-186569 (Patent Literature 1) discloses a mobile wireless phone that records, in a recording means, communication recordings such as a transmission/reception date and time of a call or mail and a destination phone number and e-mail address, presence/absence of information attached at the time of transmission/reception, and a location of that information. In addition, the mobile wireless phone disclosed in Patent Literature 1 displays communication recordings in time series when a predetermined button operation is made, for example, acquires, when there is additional information, the information from the recording means, and reproduces audio from a loudspeaker if the information is audio information or displays it if the information is letter or image information.

Further, Japanese Patent Application Laid-open No. 2005-160052 (Patent Literature 2) discloses mobile terminal equipment that includes a storage part for storing transmitted and received e-mails, a control part for detecting, among the e-mails stored in the storage part, e-mails of a designated person, and a display part for displaying in time series a list of e-mails of that person that have been detected by the control part. In other words, the mobile terminal equipment disclosed in Patent Literature 2 is capable of mixedly displaying in time series a list of transmitted e-mails and received e-mails of a designated person so that it is possible to judge at a glance what kind of e-mails have been exchanged with that person.

CITATION LIST

Patent Literature

[Patent Literature 1] Japanese Patent Application Laid-open No. 2001-186569 (FIG. 1)
[Patent Literature 2] Japanese Patent Application Laid-open No. 2005-160052 (FIG. 2)

SUMMARY OF INVENTION

Technical Problem

Incidentally, in recent years, a cellular phone terminal is capable of executing not only an application program for calls or an e-mail application program, but also a variety of application programs that run individually or in cooperation with others such as an application program for connecting to the Internet and viewing a webpage, an application program for shooting photographic images or moving images and reproducing those images, an application program for managing and reproducing music, and a schedule management application program.

Therefore, when confirming an update of data handled by a desired application program out of those plurality of application programs, for example, a user needs to operate the cellular phone terminal to activate the desired application program and thereafter make an operation to display, on a display, update information of the data handled by that application program, and the like. Specifically, when confirming update information on an e-mail communication history, for example, a user needs to activate an e-mail application program and make an operation to display a communication history by executing the e-mail application program. Similarly, when confirming a photographic image addition history, for example, a user needs to activate a photograph application program and make an operation to display an addition history by executing that application program. Therefore, when wishing to confirm an update of a plurality of pieces of data handled by different application programs, for example, a user needs to activate a certain application program first to display update information of data handled by that program and the like, then select a different application program to activate next and activate the selected application program to display update information of data handled by that program and the like, and repeat the operation one after the other, thus requiring an extremely-troublesome task. It should be noted that, practically, the same holds true for a case where there is update information of a plurality of types of data handled by the same application program, for example. For confirming an update of those different types of data and the like, a user needs to sequentially switch update information of those various types of data and make troublesome operations to display them.

The present invention has been proposed in view of the circumstances as described above, and it is an object of the invention to provide an information terminal, an information presentation method for an information terminal, and an information presentation program that enable a user to simply and easily confirm an update of a plurality of pieces of data handled by different types of application programs and the like, without any troublesome operation.

Solution to Problem

An information terminal according to the present invention includes an update information storage, an information controller, and a display controller. The update information storage stores a part of information updated in an information storage that stores a plurality of types of information, as update information associated with the respective types. The information controller monitors an information update in the information storage, stores, when the information update is made in the information storage, the part of the updated information in the update information storage as the update information associated with the respective types, and supplies the update information stored in the update information storage in an order according to a predetermined rule. The display controller displays on a screen the update information arranged in the order according to the predetermined rule, that have been supplied from the information controller. Accordingly, the present invention solves the problem described above.

In other words, according to the present invention, it is possible to integrally manage a plurality of types of update information and display them on a screen in a predetermined order (e.g., time series).

Advantageous Effects of Invention

In the present invention, since it is possible to integrally manage a plurality of types of update information and display them on a screen in, for example, time series, a plurality of pieces of update information handled by a variety of application programs executed individually can be simply and easily confirmed by a user without any troublesome operation.

BRIEF DESCRIPTION OF DRAWINGS

FIG. 1 A block diagram showing a schematic structure of a cellular phone terminal according to an embodiment of the present invention.

FIG. 2 A diagram showing an example of a display screen of the cellular phone terminal according to this embodiment, in particular, a display example of a standby screen.

FIG. 3 A diagram showing an example of the display screen of the cellular phone terminal according to this embodiment, in particular, a display example of a state where each update information display card displayed on the screen is being dragged toward an upper portion of the screen in accordance with a slide operation of a user.

FIG. 4 A diagram showing an example of the display screen of the cellular phone terminal according to this embodiment, in particular, a display example of a state where a plurality of different types of update information display cards are arranged in time series.

FIG. 5 A diagram showing an example of the display screen of the cellular phone terminal according to this embodiment, the diagram being used for explaining a state where a user is performing a slide operation in a lateral direction on the screen shown in FIG. 4.

FIG. 6 A diagram showing an example of the display screen of the cellular phone terminal according to this embodiment, the diagram showing a display example of a state after the update information display cards displayed in time series on the screen are switched by the slide operation in the lateral direction on the screen shown in FIG. 5.

FIG. 7 A diagram showing an example of the display screen of the cellular phone terminal according to this embodiment, the diagram showing another display example of a state where a plurality of different types of update information display cards are arranged in time series.

FIG. 8 A diagram showing an example of the display screen of the cellular phone terminal according to this embodiment, the diagram being used for explaining a state where a specific card is selected by the user out of the plurality of update information display cards shown in FIG. 7.

FIG. 9 A diagram showing an example of the display screen of the cellular phone terminal according to this embodiment, the diagram showing a display example of a state where personal data is designated by the card selection of FIG. 8 and a photographic image of that person and, for example, an SMS message transmission/reception history are displayed on the display screen.

FIG. 10 A block diagram showing main constituent elements for displaying the plurality of update information display cards representing updates of the plurality of respective pieces of data and the like in time series in the cellular phone terminal according to this embodiment.

FIG. 11 A flowchart showing a flow of processing at a time of displaying the update information display cards on the display screen by the structure shown in FIG. 10.

FIG. 12 A block diagram showing a specific structural example of an information manager shown in FIG. 10.

FIG. 13 A flowchart showing a flow of processing of the information manager in a case where information is added/changed (information update).

FIG. 14 A block diagram schematically showing a flow of processing carried out among constituent elements of the information manager in a case where an e-mail is newly received, as an example of the information addition/change (information update).

FIG. 15 A diagram showing an example of an information table stored in an update information storage.

FIG. 16 A flowchart showing a flow of processing of the information manager in a case where information is extracted.

FIG. 17 A block diagram schematically showing a flow of processing carried out among the constituent elements of the information manager in a case where an SMS/MMS message history is extracted, as an example of the information extraction.

DESCRIPTION OF EMBODIMENTS

Hereinafter, an embodiment of the present invention will be described with reference to the drawings.

It should be noted that this embodiment exemplifies a cellular phone terminal as an example to which an information terminal, an information presentation method, and an information presentation program of the present invention are applied, but contents described hereinbelow are merely an example and the present invention is of course not limited to this example.

(Schematic Structure of Cellular Phone Terminal)

FIG. 1 shows a schematic inner structural example of a cellular phone terminal of this embodiment.

In FIG. 1, a communication antenna 12 is, for example, a built-in antenna, and transmits and receives signal waves for calls and packet communication of e-mails and the like. A communication circuit 11 performs a frequency conversion, modulation, demodulation, and the like on transmitted and received signals.

A speaker 20 is a receiver speaker provided to the cellular phone terminal or an output speaker for a ringer (ring tone), an alarm, reproduced music, audio of reproduced moving images, and the like, and converts an audio signal supplied from a controller 10 into an acoustic wave and outputs it into the air.

A microphone 21 is a transmitter microphone or outside audio collection microphone and converts an acoustic wave into an audio signal and transmits the audio signal to the controller 10.

A display section 13 includes a display device such as a liquid crystal display and an organic EL (Electroluminescent) display and a display drive circuit for the display, and displays various letters and messages of e-mails and the like or displays still images, moving images, and the like on the display by image signals supplied from the controller 10.

An operation section 14 is constituted of, for example, operators such as a so-called touch panel, various button keys, and a jog dial, and an operation signal generator that generates operation signals when those operators are operated. It should be noted that a touch panel used as the operation section 14 can be provided almost over the entire surface of the display section 13, for example. When the touch panel is provided almost over the entire surface of the display section 13, by associating a display position on the screen of the display section 13 and a touch detection position on the touch panel with each other, a user can input instructions by touching or sliding an icon, an update information display card to be described later, or the like displayed on the screen with a finger, for example.

A near field communication section 22 performs near field communication via a near field communication antenna 23 using, for example, a so-called Bluetooth (registered trademark) system, UWB (Ultra Wide Band) system, or wireless LAN (Local Area Network). Moreover, the near field communication section 22 performs overall control in the near field communication and exchanges data with the controller 10.

A GPS section 24 receives a GPS signal from a GPS geodesic satellite via a GPS antenna 25 and obtains a latitude and longitude of a current position of the own terminal using the GPS signal. GPS data (information indicating latitude and longitude) obtained by the GPS section 24 is transmitted to the controller 10. As a result, the controller 10 can grasp the current position of the own terminal.

A noncontact communication section 26 performs noncontact communication used in, for example, so-called RFID (Radio Frequency-Identification) or noncontact IC card via a noncontact communication antenna 27. The noncontact communication section 26 is used for exchanging information on an electronic settlement by a so-called e-wallet or information as an electronic ticket for entering and exiting stations using noncontact communication.

A camera section 28 is a built-in camera for shooting still images and moving images and constituted of an optical lens, an image pickup device, a lens drive mechanism that drives the optical lens for adjusting a focus and changing a zoom magnification, a drive circuit thereof, an image processing circuit that performs image processing on an image pickup signal from the image pickup device, and the like.

An external I/F section 29 is constituted of a cable connection connector section and an external data communication interface circuit that are used when performing data communication via a cable.

A memory section 15 includes a built-in memory 16 provided inside the terminal and a detachable card-type memory 17 that stores so-called SIM (Subscriber Identity Module) information and the like. The built-in memory 16 is constituted of a ROM (Read Only Memory) and a RAM (Random Access Memory). The ROM stores an OS (Operating System), a control program used for the controller 10 to control respective sections, various initial setting values, dictionary data, sound data such as a ring tone and a key operation tone, various application programs for, for example, SNS (Social Networking Service) and SMS (Short Message Service)/MMS (Multimedia Messaging Service), e-mails, music, moving images, and photographs, an information presentation program that enables update information, that is obtained when a plurality of pieces of data handled by the various application programs are updated, to be managed integrally and presented to the user as will be described later, and the like. Further, the ROM includes a rewritable ROM such as a NAND-type flash memory and an EEPROM (Electrically Erasable Programmable Read-Only Memory). The rewritable ROM is capable of storing, for example, phone numbers, e-mail addresses, individual names, SNS account data (so-called address book data), schedule book data, calendar data, SMS/MMS/e-mail message data, communication histories including transmission and reception of the message data and incoming and outgoing calls, data on still images and moving images taken by a camera or transferred from a personal computer and the like, still images and moving images purchased through the Internet and the like, a music buying history, data files that a user has downloaded via a network, user dictionary data, and various user setting values. It should be noted that in the example shown in FIG. 1, out of a storage area for the various types of data and programs in the built-in memory 16, a program storage 16a that stores the control program, information presentation program, and various application programs, a data storage 16b that stores various types of data on an address book, messages, and the like described above, and the like are shown in the figure in particular. As a matter of course, though an illustration is omitted, the RAM occasionally stores data as a work area when the controller 10 carries out various types of data processing.

The controller 10 is constituted of a CPU (Central Processing Unit) and performs control of communication in the communication circuit 11, audio processing and control thereof, image processing and control thereof, various other types of image processing, control of respective sections, and the like. Moreover, the controller 10 executes various control programs and application programs stored in the memory section 15, various types of data processing associate therewith, and the like. In particular, as will be described later in detail, in the case of this embodiment, the controller 10 uses the information presentation program stored in the program storage 16a of the memory section 15 to integrally manage update information obtained when a plurality of pieces of data handled by various application programs and the like are updated, and executes processing for presenting them to the user.

In addition, although illustrations are omitted in FIG. 1, the cellular phone terminal of this embodiment also includes constituent elements that are provided to a general cellular phone terminal, such as a power management IC section that controls a battery for supplying power to the respective sections and power thereof, an external memory slot, a reception tuner section and an AV codec section for digital broadcasts, and a timer (clock section).

(Display Screen for Information Presentation)

FIGS. 2 to 9 each show a display example of a display screen 1 of the display section 13 according to the embodiment of the present invention. It should be noted that in this embodiment, it is assumed that a touch panel is provided almost over the entire surface of the display screen.

FIG. 2 shows a display example at a time the display screen 1 is showing a standby screen. An example where card-type (tile-like) objects representing update information (hereinafter, referred to as update information display cards 2) in a case where an update such as an addition and a change is made on a plurality of types of data are displayed on the standby screen is shown. It should be noted that the update information represented by the card-type objects in this embodiment includes not only update information on data and the like handled by a plurality of different application programs, but also update information on different types of data handled by the same application program, for example. Moreover, the display screen of FIG. 2 may be a predetermined update information display screen that has been additionally prepared instead of the standby screen.

A single update information display card 2 represents update information on one piece of data handled by a certain application program. Displayed on the single update information display card 2 is information corresponding to characteristics of a function executed by the corresponding one of the various application programs for SNS, SMS, e-mails, music, photographs, and the like, such as information indicating which of the functions is being supported, information that is unique for each function and related to an update content thereof, such as a message transmission source and a news headline, and information indicating an update date and time.

In addition, on the display screen 1, from an upper portion of the screen toward a lower portion of the screen as seen by the user from the front, a plurality of update information display cards 2 are displayed continuously in a reverse chronological order (time series). It should be noted that FIG. 2 shows an example where one update information display card indicating an SMS reception, one update information display card indicating another SMS reception, one update information display card indicating that there has been a news update from RSS (RDF (Resource Description Framework) Site Summary), one update information display card indicating an SNS update, one update information display card indicating an e-mail reception, and the like are displayed continuously in the reverse chronological order (sequentially from upper portion to lower portion on screen).

Moreover, in this embodiment, the update information display cards 2 displayed on the display screen are only a part of all the update information display cards handled by the information presentation program of this embodiment, and other update information display cards not displayed on the display screen are also arranged in time series. Further, in the cellular phone terminal of this embodiment, also the update information display cards not displayed on the display screen can be successively displayed in accordance with an instruction input from the user.

Specifically, as shown in FIG. 3, for example, in a case where a finger 3 of a user is dragged upwardly on the screen as indicated by an arrow 4 in the figure while the finger 3 is touching the touch panel provided on the display screen 1, the cellular phone terminal of this embodiment controls display so as to slide the update information display cards 2 displayed on the display screen 1 toward the upper portion of the screen. Accordingly, the update information display cards 2 that have been displayed on the display screen 1 before the drag operation is made sequentially move out of the screen from the upper portion in the reverse chronological order, whereas the update information display cards 2 earlier in time series than the update information display cards 2 that have been displayed before the drag operation is made are sequentially displayed on the display screen 1 from the lower portion of the screen. It should be noted that when an update information display card 2 earliest in time series is displayed on the display screen 1, slide display of the update information display cards in the upward direction on the screen may be stopped thereafter or a latest update information display card and update information display cards after that can be displayed in slides subsequent to the update information display card earliest in time series.

On the other hand, in a case where there are update information display cards that are later in time series than the update information display cards 2 displayed on the display screen 1, at a time the finger 3 is dragged downwardly in the screen on the touch panel, for example, the cellular phone terminal of this embodiment controls display so as to slide the update information display cards 2 displayed on the display screen 1 downwardly on the screen. Accordingly, the update information display cards 2 that have been displayed on the display screen 1 before the drag operation is made sequentially move out of the screen from the lower portion in a chronological order, and update information display cards that are later in time series than the update information display cards 2 that have been displayed before the drag operation is made are sequentially displayed on the display screen 1 from the upper portion of the screen. It should be noted that when a latest update information display card 2 in time series is displayed on the display screen 1, slide display of the update information display cards in the downward direction on the screen may be stopped thereafter or an update information display card that is earliest in time series and update information display cards after that can be displayed in slides subsequent to the latest update information display card.

Further, in addition to the sequential display of the update information display cards 2 in time series in a state where a plurality of types are mixed as described above, the cellular phone terminal of this embodiment is also capable of sequentially displaying on the screen only the update information display cards 2 categorized for each type, that is, a plurality of update information display cards included in the same category or group, in time series. In other words, the cellular phone terminal of this embodiment is also capable of sequentially displaying on the screen a plurality of update information display cards each representing an SMS reception in time series, sequentially displaying on the screen a plurality of update information display cards each representing an addition of music in time series, and sequentially displaying on the screen a plurality of update information display cards each representing an addition of a photograph in time series.

FIGS. 4 to 6 show a specific example of a switch from a state where the update information display cards 2 are displayed in time series while the plurality of types are mixed as described above to a state where only the plurality of update information display cards 2 within the same category or group are displayed in time series as described above. Specifically, in a case where the finger 3 of the user is dragged in a lateral direction on the screen as indicated by an arrow 5 in the figure while the finger 3 is selecting (touching) a desired card as shown in FIG. 5, for example, among the plurality of different types of update information display cards 2 displayed mixedly in time series as shown in FIG. 4, for example, the cellular phone terminal sequentially displays on the display screen only the update information display cards 2 of the same type that corresponds to the card selected by the user, in time series as shown in FIG. 6. It should be noted that FIGS. 4 to 6 show an example where, by the user selecting and dragging an update information display card corresponding to an incoming call as shown in FIG. 5 out of the update information display cards 2 shown in FIG. 4, only the update information display cards 2 corresponding to the incoming calls are sequentially displayed in time series as shown in FIG. 6. As a method of specifying a card type, it is also possible to display type buttons (e.g., SMS/MMS button and Phone button) on the screen and specify a card type by selecting the button, instead of selecting a card.

Moreover, the cellular phone terminal of this embodiment is capable of narrowing down, while the plurality of update information display cards 2 are sequentially displayed in time series as described above, those update information display cards to desired information and displaying them on the screen. In other words, when a desired card is selected (touched) by the finger 3 of the user as shown in FIG. 8 out of the plurality of update information display cards 2 shown in FIG. 7 and the finger 3 is dragged as indicated by an arrow 6 in the figure, for example, the cellular phone terminal specifies an individual corresponding to the selected update information display card and displays information on that individual on the screen as shown in FIG. 9. It should be noted that FIGS. 7 to 9 show an example where, by selecting an SMS update information display card 2 as shown in FIG. 8 out of the update information display cards 2 shown in FIG. 7, a photographic image 7, an SMS message transmission/reception history, and the like of the individual specified from the card are displayed on the screen as shown in FIG. 9.

(Structure for Executing Update Information Display)

FIG. 10 shows a structural example for sequentially displaying on the screen a plurality of card-type objects (update information display cards 2) representing the plurality of pieces of update information as described above in time series in the cellular phone terminal of this embodiment. It should be noted that the example of FIG. 10 shows only main constituent elements for sequentially displaying the update information display cards 2 on the screen in time series by the controller 10 shown in FIG. 1 executing various application programs and the information presentation program of this embodiment.

An application section 40 shown in FIG. 10 represents a constituent element formed by executing various application programs for calls, SNS, SMS/MMS, e-mails, music, moving images/photographs, an address book, and the like. Particularly as a function related to the update information display according to the embodiment of the present invention out of the plurality of functions executed by those various application programs, a function of receiving user input instruction information and transmitting it to a display image generator 41, a function of managing inputs and outputs of information exchanged with an information manager 42, and a function of transmitting an information update notification from the information manager 42 to the display image generator 41 can be exemplified. Specifically, in the case of this embodiment, when receiving instruction information input to the terminal by an operation made by the user using the touch panel and the like of the operation section 14, the application section 40 transmits the input instruction information to the display image generator 41. Also, when receiving information that is to be required when the update information display cards 2 and the like are displayed on the display screen from the information manager 42 to be described later, the application section 40 transmits the information to the display image generator 41. In addition, when receiving a notification that notifies that information displayed via the update information display card 2 has been updated from the information manager 42, the application section 40 transmits the notification information to the display image generator 41.

The display image generator 41 is included in a display controller according to the present invention, generates, based on the user input instruction information or information for displaying an image from the application section 40, display image information to be displayed on the display screen, and transmits the display image information to an image display instruction section 43. In other words, upon receiving information necessary for screen display from the information manager 42 via the application section 40, the display image generator 41 generates display image information for displaying the update information display cards 2 and the like on the display screen based on that information and transmits the display image information to the image display instruction section 43. Moreover, upon receiving the user input instruction information via the application section 40, the display image generator 41 analyzes what kind of an instruction the input from the user is based on the input instruction information, generates display image information on which the user instruction is reflected appropriately, and transmits it to the image display instruction section 43.

The image display instruction section 43 is included in the display controller according to the present invention and causes the display image information supplied from the display image generator 41 to be displayed on the display screen of the display section 13 shown in FIG. 1.

The information manager 42 corresponds to an update information controller according to the present invention and manages the following data that are successively updated in the cellular phone terminal. Specifically, the information manager 42 manages data of, for example, an address book including an individual name, an e-mail address, and an SNS account, incoming calls, transmission histories, transmission/reception histories of SMS/MMS and e-mail messages, an adding/buying history of photographic images and moving images taken by the camera section 28, transferred from a personal computer, or purchased from an online shop, an adding/buying history of music transferred from a personal computer or purchased from an online shop, update information of various types of data including an SNS diary and message that are used by a user via a cellular phone terminal, calendar data, and histories of files that a user has downloaded via a network. Moreover, the information manager 42 transmits information necessary for displaying the update information display cards 2 and the like on the display screen to the application section 40. In addition, when data managed as described above is updated, the information manager 42 notifies the application section 40 to that effect. It should be noted that details on specific information management by the information manager 42 will be described later.

(Overview of Operation During Update Information Display)

In the structure described above with reference to FIG. 10, display of update information on the display screen is carried out by a flow as shown in a flowchart of FIG. 11.

When displaying the update information display cards 2 on the display screen, as a process of Step S1, the application section 40 first requests the information manager 42 for information for screen display.

Upon receiving the request from the application section 40, as a process of Step S2, the information manager 42 extracts several pieces of information satisfying the request from the information managed by itself and transmits them to the application section 40 after arranging them in time series.

As a process of Step S3, the application section 40 that has received the information from the information manager 42 transmits the information to the display image generator 41.

As a process of Step S4, the display image generator 41 that has received the information from the application section 40 generates display image information based on the received information and transmits the display image information to the image display instruction section 43.

As a process of Step S5, the image display instruction section 43 that has received the display image information instructs the display section 13 to display an image on the display screen based on the display image information.

Moreover, as a process of Step S6, the display image generator 41 judges whether an update of screen display is necessary. In other words, the display image generator 41 judges whether an update of screen display is necessary for reflecting, when an instruction input is made by a user or an information update is made, the input or update on the display on the display screen. Further, the display image generator 41 judges whether an update of screen display is necessary for realizing animation display such as slide display of the update information display cards 2 on the display screen by a drag operation made by a user as described above.

Then, when it is judged in Step S6 that an update of screen display is necessary, the display image generator 41 requests the application section 40 for information necessary for updating the screen display as a process of Step S7. The process returns to Step S1 after Step S7.

As described above, in the cellular phone terminal of this embodiment, the processes of Steps S1 to Step S7 are repeated to perform screen display.

(Structure of Information Manager)

FIG. 12 shows a specific structural example of the information manager 42 shown in FIG. 10 above. It should be noted that the application section 40 is also illustrated in FIG. 12.

For integrally managing all types of update information and readily extracting the update information as necessary to transmit them to the display image generator 41, the information manager 42 includes an information selector 50, an update information manager 51, and an update information storage 61 as shown in FIG. 12. It should be noted that information storages 62 to 70 may be included in the information manager 42 or may be an information accumulation means additionally provided inside the cellular phone terminal. In addition, the information storages 62 to 70 do not necessarily need to be an information accumulation means provided inside the cellular phone terminal and may instead be provided outside the cellular phone terminal via a network 71 like the information storage 70, for example.

Each of the information storages 62 to 70 exists for a corresponding information type such as a message, address book, SNS, SMS/MMS, e-mail, and calendar. Further, in addition to accumulating information of the associated type, the information storages 62 to 70 have, as common functions, a function of returning information stored inside in a designated order in response to a request from the information selector 50 or the update information manager 51 and a function of extracting and returning, when a limited number of pieces of information are requested, that number of pieces of information in a designated order. It should be noted that in FIG. 12, exemplified as the information storages are information storages corresponding to the respective associated types, such as an SNS information storage 62 that stores various types of information on SNS, an SMS/MMS information storage 63 that stores various types of information on SMS and MMS, an e-mail information storage 64 that stores various types of information on e-mails, an address book information storage 65 that stores various types of information on an address book, an RSS/ATOM information storage 66 that stores various types of information on RSS, a calendar information storage 67 that stores various types of information on calendars, an IM information storage 68 that stores various types of information on IM (Instant Messaging), and media information storages 69 and 70 that store various types of information on images and music. Furthermore, the information storages 62 to 70 can be commonly used by the application programs (i.e., application section 40) of the cellular phone terminal. In other words, an application program that handles SMS, MMS, and e-mail messages, an application program that handles an address book, an application program that handles images, an application program that handles music, and the like can store information that they use in the corresponding information storages for use.

The information selector 50 constitutes a part of the update information controller according to the present invention and, upon receiving a request from the application section 40, selects an appropriate information storage out of the information storages 62 to 70 in response to the request, extracts appropriate information out of the information stored in the selected information storage, and returns the information to the application section 40.

The update information manager 51 constitutes a part of the update information controller according to the present invention and monitors information updates of the information storages 62 to 70, that is, information updates such as accumulation (addition) of new information in the information storages 62 to 70 and a change/deletion of information already stored therein. In the case of this embodiment, the information storages 62 to 70 each have a function of notifying the outside of an information update when updated. Therefore, the update information manager 51 detects that an information update has been made based on the update notification from the information storages 62 to 70. Then, when an information update is made in the information storages 62 to 70, the update information manager 51 acquires an update content from the corresponding information storage and caches it in the update information storage 61. It should be noted that instead of detecting whether an information update has been made based on the update notification from the information storages 62 to 70 as described above, the update information manager 51 may monitor whether an information update is made by periodically checking the stored information of the information storages 62 to 70, for example.

Further, the update information manager 51 also monitors an information update of the update information storage 61, that is, an information update such as accumulation (addition) of new information in the update information storage 61 and a change/deletion of information already stored therein. Then, when an information update is made in the update information storage 61, the update information manager 51 notifies the application section 40 of the information update via the information selector 50. It should be noted that when the update information storage 61 has a function of notifying the outside of the information update similar to the information storages 62 to 70 described above, the update information manager 51 detects that an information update has been made based on the update notification from the update information storage 61. It is also possible for the update information manager 51 to monitor whether an information update is made by periodically checking the stored information of the update information storage 61, for example.

Being one of the various information storages, the update information storage 61 corresponds to an update information storage according to the present invention in particular and is prepared for accumulating in advance information indicating update contents in the various other information storages 62 to 70.

As described above, the information manager 42 of this embodiment includes the update information manager 51 and the update information storage 61, and the update information manager 51 constantly monitors information updates in the information storages 62 to 70 to store an update content in the update information storage 61 when an information update is made in the information storages 62 to 70. Accordingly, for example, the information manager 42 of this embodiment can save time as compared to a case where an update content is acquired from the information storages 62 to 70 every time a request is received from the application section 40, and all the update contents can be returned to the application section 40 to be transmitted to the display image generator 41 at high speed.

(Information Update (Additional Information Accumulation, Change of Information) in Various Information Storages)

When an update such as an addition of new information, information change, and the like is made, the various information storages 62 to 70 described above arrange and store the information in time series based on the update dates and times. It should be noted that when the pieces of information are not arranged and stored in time series or not strictly arranged in time series and stored, for enabling the information to be extracted at high speed thereafter, each of the information storages 62 to 70 creates a correspondence table regarding an order of the pieces of information arranged in time series and an order in which the pieces of information are actually stored, and also stores data of the correspondence table.

When information is added or changed in the information storages 62 to 70, the information manager 42 operates as follows. FIG. 13 shows a processing flow of the information manager 42 in a case where information is added or changed in the information storages 62 to 70. Further, FIG. 14 schematically shows a flow of processing carried out among the constituent elements in a case where an e-mail is newly received, as an example of an addition of information.

In FIG. 13, when information is newly added, as a process of Step S11, the information selector 50 receives a content and type of information to be updated from the application section 40. In a case where an e-mail is newly received in FIG. 14, the information selector 50 receives data notifying an e-mail reception and e-mail data from the application program for e-mails. As the e-mail data, a received date and time, a sender e-mail address, a title, a mail text, a mail header, and data of appended data if there is any can be exemplified.

As a process of Step S12, the information selector 50 that has received the content and type of the information to be updated selects an appropriate information storage corresponding to the type of the received information and transmits the update content to that information storage. In the example of FIG. 14, the information selector 50 selects the e-mail information storage 64 and transmits the e-mail data to the e-mail information storage 64.

As a process of Step S13, the information storage that has received the information from the information selector 50 newly stores the received information or stores it by changing the existing information. In the example of FIG. 14, the e-mail information storage 64 stores the received e-mail data.

As a process of Step S14, the information storage that has newly stored the received information or changed information notifies (notifies update information manager 51 in this example) that its own stored information has been changed. In the example of FIG. 14, the e-mail information storage 64 notifies the update information manager 51 that the received e-mail has been stored.

As a process of Step S15, the update information manager 51 that has detected that an information update has been made by the notification from the information storage acquires information on an update content thereof from the information storage that has made the notification and transmits the information to the update information storage 61. In the example of FIG. 14, the update information manager 51 that has detected the notification from the e-mail information storage 64 acquires an update content from the e-mail information storage 64 and transmits the information to the update information storage 61.

Also at this time, as a process of Step S16, the update information manager 51 acquires associated information linked with the update content from the information storage as necessary and transmits it to the update information storage 61 together with the update content. In the example of FIG. 14, the update information manager 51 acquires, based on an e-mail address of a sender of the e-mail, information such as a registered name registered in an address book in association with that e-mail address from the address book information storage 65 as e-mail-associated information, and transmits the information such as a registered name to the update information storage 61.

The update information storage 61 stores the information received from the update information manager 51 or stores it by changing existing information. In the example of FIG. 14, the update information storage 61 stores the update content or registered name related to the e-mail. It should be noted that similar to the case of the various information storages 62 to 70 described above, when the pieces of information are not stored in time series or not strictly arranged in time series and stored, for enabling the information to be extracted at high speed thereafter, the update information storage 61 creates a correspondence table regarding an order of the pieces of information arranged in time series and an order in which the pieces of information are actually stored, and also stores data of the correspondence table.

(Example of Update Content Acquired by Update Information Manager from Information Storage)

FIG. 15 shows, as an example of information stored in the update information storage 61, an update information table showing update contents acquired from various other information storages 62 to 70. It should be noted that the update information table shown in FIG. 15 shows only a main portion of the update information table actually stored in the update information storage 61, and many more items are actually prepared in addition thereto.

The update information table shown in FIG. 15 includes items for registering additional information on an attribute of update information, an information reference destination, a text, and the like, such as a "category", "subcategory", "source ID", "image", "text", "timestamp", "display time", and "preview text".

Here, the items in the update information table shown in FIG. 15 can be roughly categorized into a "content type" and "content type specifics". It should be noted that the "content type" and "content type specifics" in FIG. 15 are not actually stored as information in the update information table but described to indicate a card type to help understand the descriptions. When actually determining a card type in an application in this embodiment, other types of information including the "category" and "subcategory" to be described later are used. When taking a type of a "received e-mail" (unregistered in address book) as an example, the application of this embodiment determines that a card type is the "received e-mail" (unregistered in address book) based on information "e-mail" registered as the "category" to be described later and the fact that no information is registered as the "image".

The "content type" indicates a type of information registered in the update information table. Examples of the content type include content types such as a "media", "telephone", "SMS/MMS", "e-mail", and "SNS".

The "content type specifics" are obtained by additionally segmentalizing the content type. Examples of the content type specifics belonging to the content type "media" include specific content types such as a "latest downloaded song", "latest downloaded moving image (video)", "latest captured moving image", and "latest captured photograph". Similarly, examples of the content type specifics belonging to the content type "telephone" include specific content types such as a "missed call from phone number registered in address book" and "missed call from phone number unregistered in address book". Examples of the content type specifics belonging to the content type "SMS/MMS" include specific content types such as "SMS/MMS message reception registered in address book" and "SMS/MMS message reception unregistered in address book". Examples of the content type specifics belonging to the content type "e-mail" include specific content types such as "e-mail received from e-mail address registered in address book" and "e-mail received from e-mail address unregistered in address book". Examples of the content type specifics belonging to the content type "SNS" include specific content types such as "SNS update registered in address book" and "SNS update unregistered in address book".

In addition, out of the update information table shown in FIG. 15, information indicating a category to which a content belongs is registered as the item "category". In the example of FIG. 15, information indicating that a content belongs to the category "media" is registered as the category item corresponding to each of the content type specifics "latest downloaded song", "latest downloaded moving image", "latest captured moving image", and "latest captured photograph". Moreover, information indicating that a content belongs to the category "telephone" is registered as the category item corresponding to each of the content type specifics "missed call from phone number registered in address book" and "missed call from phone number unregistered in address book". Similarly, information indicating that a content belongs to the category "SMS/MMS" is registered as the category item corresponding to each of the content type specifics "SMS/MMS message reception registered in address book" and "SMS/MMS message reception unregistered in address book". Information indicating that a content belongs to the category "e-mail" is registered as the category item corresponding to each of the content type specifics "e-mail received from e-mail address registered in address book" and "e-mail received from e-mail address unregistered in address book". Information indicating that a content belongs to the category "SNS" is registered as the category item corresponding to each of the content type specifics "SNS update registered in address book" and "SNS update unregistered in address book".

Information indicating a subcategory obtained by additionally segmentalizing the category is registered as the item "subcategory". In the example of FIG. 15, information indicating that the content belongs to a subcategory "music" is registered as the subcategory item corresponding to the content type specifics "latest downloaded song", information indicating that the content belongs to a subcategory "moving image (video)" is registered as the subcategory item corresponding to the content type specifics "latest downloaded moving image", information indicating that the content belongs to a subcategory "moving image (video)" is registered as the subcategory item corresponding to the content type specifics "latest captured moving image", and information indicating that the content belongs to a subcategory "photograph" is registered as the subcategory item corresponding to the content type specifics "latest captured photograph". Similarly, information indicating that the content belongs to a subcategory "missed call" is registered as the subcategory item corresponding to each of the content type specifics "missed call from phone number registered in address book" and "missed call from phone number unregistered in address book". Information indicating that the content belongs to a subcategory "received SMS/MMS" is registered as the subcategory item corresponding to each of the content type specifics "SMS/MMS message reception registered in address book" and "SMS/MMS message reception unregistered in address book". Information indicating that the content belongs to a subcategory "received e-mail" is registered as the subcategory item corresponding to each of the content type specifics "e-mail received from e-mail address registered in address book" and "e-mail received from e-mail address unregistered in address book". Information indicating that the content belongs to a subcategory prepared for each "SNS service provider" is registered as the subcategory item corresponding to each of the content type specifics "SNS update registered in address book" and "SNS update unregistered in address book".

Information indicating an information storage location in the various information storages described above is registered as the item "source ID". In the example of FIG. 15, information on a "media ID" that specifies a storage location of data of music, moving images, photographs, and the like in the media information storages 69 and 70 described above is registered as the source ID item corresponding to each of the content type specifics "latest downloaded song", "latest downloaded moving image", "latest captured moving image", and "latest captured photograph". Information on a "call log ID" that specifies a storage location of an incoming call history corresponding to a missed call in the address book information storage 65 described above is registered as the source ID item corresponding to each of the content type specifics "missed call from phone number registered in address book" and "missed call from phone number unregistered in address book". Similarly, information on a "message ID" that specifies an SMS/MMS message storage location in the SMS/MMS information storage 63 is registered as the source ID item corresponding to each of the content type specifics "SMS/MMS message reception registered in address book" and "SMS/MMS message reception unregistered in address book". Information on an "e-mail ID" that specifies a received e-mail storage location in the e-mail information storage 64 is registered as the source ID item corresponding to each of the content type specifics "e-mail received from e-mail address registered in address book" and "e-mail received from e-mail address unregistered in address book". Information on an "SNS update message ID" that specifies an SNS update information storage location in the SNS information storage 62 is registered as the source ID item corresponding to each of the content type specifics "SNS update registered in address book" and "SNS update unregistered in address book". Specifically, information registered as the item "source ID" is used for referencing, when a desired update information display card 2 is selected by a user, specific information on an individual specified by that update information display card 2 or a photograph, a message, a phone number, an e-mail address, and communication histories of that individual as in the examples of FIGS. 8 and 9 described above, for example.

Information indicating a reference location of an image to be displayed in the update information display card described above is registered as the item "image". It should be noted that the image reference location may be inside the cellular phone terminal or may be a location specified by a URI (Uniform Resource Identifier) on the Internet, for example. In the example of FIG. 15, reference destination information of an album jacket image of a song is registered as the image item corresponding to the content type specifics "latest downloaded song", reference destination information of a thumbnail image of a downloaded moving image is registered as the image item corresponding to the content type specifics "latest downloaded moving image", reference destination information of a thumbnail moving image of a captured moving image is registered as the image item corresponding to the content type specifics "latest captured moving image", and reference destination information of a thumbnail image of a photograph is registered as the image item corresponding to the content type specifics "latest captured photograph". Moreover, reference destination information of a photographic image of a caller registered in an address book is registered as the image item corresponding to the content type specifics "missed call from phone number registered in address book". Reference destination information of a photographic image of an SNS update contactor registered in an address book is registered as the image item corresponding to the content type specifics "SNS update registered in address book". Reference destination information of a photographic image and the like prepared for each SNS service provider is registered as the image item corresponding to the content type specifics "SNS update unregistered in address book". It should be noted that although no reference destination information is registered in particular as the image item corresponding to the content type specifics "missed call from phone number unregistered in address book", the image item corresponding to the content type specifics "SMS/MMS message reception unregistered in address book", and the image item corresponding to the content type specifics "e-mail received from e-mail address unregistered in address book", when an image representing a non-registrant of an address book is determined in advance, reference destination information of that image may be registered. Further, in the example of FIG. 15, although no reference destination information is registered as the image item corresponding to the content type specifics "e-mail received from e-mail address registered in address book", reference destination information of a photographic image of a sender of the received e-mail registered in an address book may be registered.

Text information to be displayed in the update information display card described above is registered as the item "text". In the example of FIG. 15, text information on an "artist name" of a song is registered as the text item corresponding to the content type specifics "latest downloaded song", text information on a "title name" of a downloaded moving image is registered as the text item corresponding to the content type specifics "latest downloaded moving image", and text information on a "title name" of a captured moving image is registered as the text item corresponding to the content type specifics "latest captured moving image". It should be noted that although no text information is registered in particular as the text item corresponding to the content type specifics "latest captured photograph", when information on some kind of a comment, shooting condition, and the like is attached to the captured photograph, text information on that comment, shooting condition, and the like may be registered. Similarly, text information on a "name (registered name)" and the like of a caller registered in an address book is registered as the text item corresponding to the content type specifics "missed call from phone number registered in address book". Text information on a "caller ID" (e.g., when caller ID is blocked, "unknown") is registered as the text item corresponding to the content type specifics "missed call from phone number unregistered in address book". Text information on a "name (registered name)" of a sender of a message registered in an address book is registered as the text item corresponding to the content type specifics "SMS/MMS message reception registered in address book". Text information on a "caller ID" (when caller ID is blocked, "unknown") is registered as the text item corresponding to the content type specifics "SMS/MMS message reception unregistered in address book". Text information on a "name (registered name)" of a sender of an e-mail registered in an address book is registered as the text item corresponding to the content type specifics "e-mail received from e-mail address registered in address book". Text information on a "sender e-mail address" is registered as the text item corresponding to the content type specifics "e-mail received from e-mail address unregistered in address book". Text information on a "name (registered name)" of an SNS update contactor registered in an address book is registered as the text item corresponding to the content type specifics "SNS update registered in address book". Text information on an "SNS service name", for example, is registered as the text item corresponding to the content type specifics "SNS update unregistered in address book".

Information on a date and time (year/month/day/sec etc.) on/at which information is stored in the various information storages described above is registered as the item "timestamp". In the example of FIG. 15, date and time information on/at which data of a song and a moving image are stored in an information storage are registered as the timestamp items respectively corresponding to the content type specifics "latest downloaded song" and "latest downloaded moving image". Moreover, date and time information on/at which data of a moving image and a photograph are stored in an information storage are registered as the timestamp items respectively corresponding to the content type specifics "latest captured moving image" and "latest captured photograph". Similarly, date and time information on/at which a fact that a call has been received is stored in an information storage is registered as the timestamp item corresponding to each of the content type specifics "missed call from phone number registered in address book" and "missed call from phone number unregistered in address book". Date and time information on/at which a received message is stored in an information storage is registered as the timestamp item corresponding to each of the content type specifics "SMS/MMS message reception registered in address book" and "SMS/MMS message reception unregistered in address book". Date and time information on/at which a received e-mail is stored in an information storage is registered as the timestamp item corresponding to each of the content type specifics "e-mail received from e-mail address registered in address book" and "e-mail received from e-mail address unregistered in address book". Date and time information on/at which information on an SNS update is stored in an information storage is registered as the timestamp item corresponding to each of the content type specifics "SNS update registered in address book" and "SNS update unregistered in address book".

Date and time information (year/month/day/sec etc.) on/at which information is displayed on the update information display card described above is registered as the item "display time". In the example of FIG. 15, date and time information on/at which a moving image and a photograph are captured are registered as the display time items respectively corresponding to the content type specifics "latest captured moving image" and "latest captured photograph". It should be noted that in the example of FIG. 15, although no date and time information is registered in particular as the display time item corresponding to each of the content type specifics "latest downloaded song" and "latest downloaded moving image", date and time information on/at which a song and a moving image are downloaded may be registered, for example. Similarly, date and time information on/at which a call is missed is registered as the display time item corresponding to each of the content type specifics "missed call from phone number registered in address book" and "missed call from phone number unregistered in address book". Date and time information on/at which a message is received or sent is registered as the display time item corresponding to each of the content type specifics "SMS/MMS message reception registered in address book" and "SMS/MMS message reception unregistered in address book". Date and time information on/at which an e-mail is received or sent is registered as the display time item corresponding to each of the content type specifics "e-mail received from e-mail address registered in address book" and "e-mail received from e-mail address unregistered in address book". Date and time information of an SNS update is registered as the display time item corresponding to each of the content type specifics "SNS update registered in address book" and "SNS update unregistered in address book".

Here, the date and time information registered as the item "display time" differs in a level of detail of a display time (e.g., hourly display, display by minutes, and display by seconds) for each of the application programs corresponding to the respective update information display cards. Further, in this embodiment, the reason the two pieces of date and time information of the "timestamp" and "display time" are handled in the update information table is because it is difficult to collectively sort date and time information of both the "timestamp" and "display time" in time series. Specifically, for example, there are cases where an error is caused between the date and time information of those two as a matter of convenience of a system and the like, and date and time information of a display time differs in handling time for each application program and the level of detail of a display time also differs as described above. It should be noted that examples of the time that differs for each type of application program include mail transmission/reception times, a called time, and an SNS posting time. Moreover, an example of the case where an error is caused between the pieces of date and time information as a matter of convenience of a system and the like is a case where, regarding an e-mail, for example, a delivery delay is caused due to a condition of a server or a reception-side terminal and a mail transmission time (date and time information of display time) and a time at which the mail is stored in the terminal (date and time information of timestamp) largely differ. In addition, in the case of SNS, for example, in a case where a data update is not carried out in real time and a user actively updates it or an update is carried out at designated time intervals (e.g., every 5 minutes) depending on an SNS service, a large difference is caused between a time at which an SNS message is posted (date and time information of display time) and a time at which the message is stored in the terminal (date and time information of timestamp).

Text information used in preview-displaying detailed information of an update information display card at a time when a desired update information display card is selected by a user is registered as the item "preview text". In the example of FIG. 15, text information on a song title is registered as the preview text item corresponding to the content type specifics "latest downloaded song". It should be noted that in the example of FIG. 15, although no information is registered in particular as the preview text item corresponding to each of the content type specifics "latest downloaded moving image", "latest captured moving image", and "latest captured photograph", when a comment or the like is added to a moving image, for example, text information of that comment or the like may be registered. Similarly, a phone number of a caller of a missed call is registered as the preview text item corresponding to the content type specifics "missed call from phone number registered in address book". It should be noted that no information is registered in particular as the preview text item corresponding to the content type specifics "missed call from phone number unregistered in address book". Out of an SMS/MMS message, text information within a limited number of letters from a head thereof, for example, is registered as the preview text item corresponding to each of the content type specifics "SMS/MMS message reception registered in address book" and "SMS/MMS message reception unregistered in address book". Out of a title or text of an e-mail, text information within a limited number of letters from a head thereof, for example, is registered as the preview text item corresponding to each of the content type specifics "e-mail received from e-mail address registered in address book" and "e-mail received from e-mail address unregistered in address book". Text information of an SNS-updated message is registered as the preview text item corresponding to each of the content type specifics "SNS update registered in address book" and "SNS update unregistered in address book".

It should be noted that in addition to the items up to the preview text item shown in the example of FIG. 15, information on a flag or reference destination necessary for displaying, at a time a desired update information display card is selected by a user, details of that update information display card is also registered in the update information table of this embodiment.

(Extraction of Information from Various Information Storages)

When extracting information from the various information storages 62 to 70, the information manager 42 operates as follows. FIG. 16 shows a processing flow of the information manager 42 that is carried out when extracting information. In addition, FIG. 17 schematically shows an example of a processing flow among the constituent elements of the information manager 42 carried out when information on a message history is extracted from the SMS/MMS information storage 63.

In FIG. 16, when information is extracted from the various information storages 62 to 70, as a process of Step S21, the information selector 50 receives a query that requests desired information from the application section 40. Specifically, when SMS/MMS message histories are extracted in FIG. 17, the information selector 50 receives a query that requests SMS/MMS message histories from an SMS/MMS application program as an extraction condition. It should be noted that an example of the query that requests SMS/MMS message histories is a query that requests 10 latest message histories.

As a process of Step S22, the information selector 50 that has received the extraction condition selects an appropriate information storage based on the extraction condition and transmits the extraction condition to that information storage. In the example of FIG. 17, the information selector 50 selects the SMS/MMS information storage 63 and transmits the extraction condition that requests SMS/MMS message histories to the SMS/MMS information storage 63.

As a process of Step S23, the information storage that has received the extraction condition from the information selector 50 interprets the received extraction condition and extracts appropriate information that satisfies the extraction condition from stored information. In the example of FIG. 17, the SMS/MMS information storage 63 extracts SMS/MMS message histories as information that satisfies the extraction condition.

As a process of Step S24, the information storage that has extracted the information that satisfies the extraction condition rearranges the extracted pieces of information based on the extraction condition and transmits them to the information selector 50. In the example of FIG. 17, the SMS/MMS information storage 63 rearranges the SMS/MMS message histories based on the extraction condition and transmits them to the information selector 50.

The information selector 50 that has received the information from the information storage transmits the information to the application section 40 as the request source. In the example of FIG. 17, the information selector 50 transmits the SMS/MMS message histories to the SMS/MMS application program.

It should be noted that although FIGS. 16 and 17 show the example in which the information selector 50 selects an information storage corresponding to the extraction condition and extracts information from that information storage, it is also possible to transmit, in a case where information stored in the update information storage 61 suffices information that satisfies the extraction condition, for example, the extraction condition to the update information storage 61. In this case, the update information storage 61 interprets the extraction condition, extracts appropriate information that satisfies the extraction condition from stored information, and transmits the extracted information to the information selector 50 after rearranging them based on the extraction condition.

Further, when information is extracted as described above, the information storages 62 to 70 or the update information storage 61 also update/updates information representing an information extraction count and retain/retains it. Similarly, when information on an e-mail or the like is extracted and a content thereof is displayed on a display or is not displayed on the display, the information storages 62 to 70 or the update information storage 61 also update/updates information indicating that the information is "read" or "unread" and retain/retains it. As a result, it becomes possible to reflect the information on the information extraction count and information on read/unread on the update information display card thereafter.

Further, as described above, in a case where data of a correspondence table regarding the order of the pieces of information arranged in time series and the order in which the pieces of information are actually stored is stored in the information storages 62 to 70, when extracting information from the information storages 62 to 70, the pieces of information are extracted in time series based on the correspondence table.

It should be noted that although the example in which information is extracted from the information storages 62 to 70 has been described, the same holds true for a case where the update information storage 61 stores the data of the correspondence table. When information is extracted from the update information storage 61, pieces of information are extracted in time series based on the correspondence table.

(Summary)

As described heretofore, the cellular phone terminal of this embodiment enables outlines of a plurality of pieces of update information handled by various application programs to be managed integrally and presented to the user and also details of the update information to be presented to the user without requiring the user to perform troublesome operations.

It should be noted that the above embodiment is merely an example of the present invention. Therefore, the present invention is not limited to the above embodiment and can of course be variously modified depending on a design and the like without departing from the technical idea of the present invention.

The above embodiment has exemplified the cellular phone terminal, but the present invention is also applicable to various information terminals that are capable of executing various application programs.

REFERENCE SIGNS LIST 1 display screen
2 update information display card
3 finger of user
4, 5, 6 arrow
7 photographic image of individual
10 controller
11 communication circuit
12 communication antenna
13 display section
14 operation section (touch sensor)
15 memory section
16 built-in memory
17 card-type memory
16a program storage
16b data storage
20 speaker
21 microphone
22 near field communication section
23 near field communication antenna
24 GPS section
25 GPS antenna
26 noncontact communication section
27 noncontact communication antenna
28 camera section
29 external I/F section
40 application section
41 display image generator
42 information manager
43 image display instruction section
50 information selector
51 update information manager
61 update information storage
62 SNS information storage
63 SMS/MMS information storage
64 e-mail information storage
65 address book information storage
66 RSS/ATOM information storage
67 calendar information storage
68 IM information storage
69 media information (local media information) storage
71 network
70 media information (network media information) storage

The invention claimed is:

1. An information terminal, comprising:
a plurality of storage areas to each store a respective type of information;
an update information storage, provided separately from the plurality of storage areas, to store update information associated with one or more of the respective types of information;
processing circuitry configured to
receive the respective types of information from an external source over a network,
control the plurality of storage areas to store the received respective types of information,
monitor for at least one notification indicating an information update in at least one of the storage areas, the information update indicating that update information has been stored in at least one of the storage areas,
store, in response to receiving, from at least one of the storage areas, at least one notification of the information update being made in at least one of the storage areas, a part of the updated information in the update information storage as the update information associated with the respective types,
monitor the update information storage for the storage of the update information associated with the respective types,
supply the update information stored in the update information storage in an order according to a predetermined rule; and
display circuitry configured to display on a screen the update information that have been supplied from the processing circuitry arranged in the order according to the predetermined rule,
wherein the update information storage retains correspondence table information on a storage order of the update information and the order according to the predetermined rule.

2. The information terminal according to claim 1, wherein the processing circuitry acquires information associated with the part of the updated information from one of the storage areas and stores them in the update information storage together with the update information.

3. The information terminal according to claim 1, wherein the update information storage returns, in response to a request from the processing circuitry, the plurality of stored pieces of update information in the order according to the predetermined rule.

4. The information terminal according to claim 1,
wherein the information storage returns, in response to a request from the processing circuitry, the plurality of stored pieces of information in the order according to the predetermined rule, and
wherein the display circuitry displays on the screen the plurality of pieces of information arranged in the order according to the predetermined rule, that have been supplied from the processing circuitry.

5. The information terminal according to claim 1, wherein the order includes an order based on which the information was stored in the update information storage.

6. The information terminal according to claim 1, wherein the information update is received from at least one of the storage areas.

7. The information terminal according to claim 1, wherein the update information storage stores update information from a plurality of the storage areas.

8. The information terminal according to claim 1, wherein the predetermined rule is an order in which the update information is stored.

9. The information terminal according to claim 1, wherein the information update includes a changing of information stored in at least one of the plurality of storage areas.

10. The information terminal according to claim 1, wherein the information update includes a deleting of information stored in at least one of the plurality of storage areas.

11. An information presentation method, comprising:
storing a respective type of information in each of a plurality of storage areas;
receiving, by an information controller, the respective types of information from an external source over a network,
controlling, by the information controller, the plurality of storage areas to store the received respective types of information,
monitoring, by the information controller, for at least one notification of an information update in at least one of the storage areas, the information update indicating that update information has been stored in at least one of the storage areas;
storing, by the information controller, in response to receiving, from at least one of the storage areas, at least one notification of the information update being made in at least one of the storage areas, a part of the updated information in an update information storage as update information associated with the respective types, the update information storage being provided separately from the plurality of storage areas;
monitoring the update information storage for the storage of the update information associated with the respective types;
supplying, by the information controller, the update information stored in the update information storage in an order according to a predetermined rule; and
displaying, by a display controller, on a screen, the update information that have been supplied from the information controller arranged in the order according to the predetermined rule,
wherein the update information storage retains correspondence table information on a storage order of the update information and the order according to the predetermined rule.

12. A non-transitory computer-readable medium storing thereon computer-readable instructions which when executed by a computer cause the computer to perform a method comprising:
storing a respective type of information in each of a plurality of storage areas;
receiving the respective types of information from an external source over a network,
controlling the plurality of storage areas to store the received respective types of information,
monitoring for at least one notification of an information update in at least one of the storage areas, the information update indicating that update information has been stored in at least one of the storage areas;
storing, in response to receiving, from at least one of the storage areas, at least one notification of the information update being made in at least one of the storage areas, a part of the updated information in an update information storage as update information associated with the respective types, the update information storage being provided separately from the plurality of storage areas;

monitoring the update information storage for the storage of the update information associated with the respective types;
supplying the update information stored in the update information storage in an order according to a predetermined rule; and
displaying on a screen the supplied update information arranged in the order according to the predetermined rule,
wherein the update information storage retains correspondence table information on a storage order of the update information and the order according to the predetermined rule.

* * * * *